US012677072B2

(12) United States Patent
Ja

(10) Patent No.: US 12,677,072 B2
(45) Date of Patent: Jul. 7, 2026

(54) METHOD AND SYSTEMS FOR ADAPTIVE PIXEL CORRECTION

(71) Applicant: ARACELI BIOSCIENCES INC., Tigard, OR (US)

(72) Inventor: Shiou-jyh Ja, Portland, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 172 days.

(21) Appl. No.: 18/661,423

(22) Filed: May 10, 2024

(65) Prior Publication Data

US 2025/0350849 A1     Nov. 13, 2025

(51) Int. Cl.
| | |
|---|---|
| *H04N 23/76* | (2023.01) |
| *H04N 23/52* | (2023.01) |
| *H04N 23/72* | (2023.01) |
| *H04N 23/73* | (2023.01) |
| *H04N 25/47* | (2023.01) |
| *H04N 25/50* | (2023.01) |

(52) U.S. Cl.
CPC ............. *H04N 23/76* (2023.01); *H04N 23/52* (2023.01); *H04N 23/72* (2023.01); *H04N 23/73* (2023.01); *H04N 25/47* (2023.01); *H04N 25/50* (2023.01)

(58) Field of Classification Search
CPC ........ H04N 23/76; H04N 23/52; H04N 23/72; H04N 23/73; H04N 25/47; H04N 25/50; H04N 25/68
USPC ...................................... 348/222.1
See application file for complete search history.

(56) References Cited

U.S. PATENT DOCUMENTS

| | | | | |
|---|---|---|---|---|
| 7,460,688 B2 * | 12/2008 | Stanback | ............... | H04N 25/68 |
| | | | | 348/246 |
| 7,920,171 B2 * | 4/2011 | Hu | ......................... | H04N 25/61 |
| | | | | 348/241 |
| 8,000,559 B2 * | 8/2011 | Kwon | .................... | H04N 25/61 |
| | | | | 348/222.1 |
| 9,424,632 B2 * | 8/2016 | Patil | ......................... | G06T 5/50 |
| 2018/0376085 A1 * | 12/2018 | Tabel | ..................... | H04N 25/72 |
| 2024/0233303 A1 * | 7/2024 | Liu | ......................... | G01S 17/86 |

OTHER PUBLICATIONS

"Dark-frame subtraction," Wikipedia Website, Available Online at https://en.wikipedia.org/wiki/Dark-frame_subtraction, Page Created Jan. 27, 2007, 2 pages.

\* cited by examiner

*Primary Examiner* — Lin Ye
*Assistant Examiner* — Chan T Nguyen
(74) *Attorney, Agent, or Firm* — McCoy Russell LLP

(57)     ABSTRACT

Methods and systems are provided for correcting pixel intensity variation in an image. In one example, a method comprises: acquiring reference images at different sensor temperatures and/or exposure times; generating a plurality of parameters via identifying a cut-off pixel number using a break-up point between a linear region and a non-linear region of an intensity curve for each reference image; sending coordinates of identified pixels to be corrected to an image sensor; capturing a pixel-corrected image via the image sensor by replacing a pixel intensity at coordinates of the pixels to be corrected with a local statistic intensity; and outputting the pixel-corrected image for display and/or storage.

9 Claims, 12 Drawing Sheets

100

METHOD AND SYSTEMS FOR ADAPTIVE PIXEL CORRECTION

FIELD

The present description relates generally to methods and systems for pixel correction of an image by an imaging device.

BACKGROUND/SUMMARY

A digital image obtained with an imaging device, such as a camera using a charge-coupled device (CCD) or a complementary metal-oxide-semiconductor (CMOS) sensor, may exhibit "hot pixels", which are pixels characterized by a higher brightness/greater intensity than surrounding pixels. Some hot pixels may reach a saturated intensity value at which the hot pixel becomes a constant bright pixel in digital images captured by the camera. Other hot pixels may have variable intensities and also be sensitive to input light. Hot pixels may post significant interference to imaging applications, especially those involving dimmed targets such as astronomy and fluorescence microscopy with low-quantum efficiency dyes.

A hot pixel correction procedure may be implemented to reduce or remove hot pixel intensity. For example, a sensor array (e.g., of the camera) may be cooled so that an intensity of the hot pixels becomes insignificant, and residual hot pixels may be calibrated out via dark frame subtraction. In dark frame subtraction, hot pixels in a digital image may be removed by correcting each individual pixel irrespective to its intensity. Traditional dark frame subtraction includes removing an intensity pedestal value at each pixel acquired by imaging a dark scene image at fixed imaging conditions, where the imaging conditions include sensor temperature, sensor gain setting, and exposure time. A pedestal value of each pixel depends on the imaging conditions, therefore application of traditional dark frame subtraction may be effective for scenarios where a camera temperature is controlled (e.g., kept the same for a duration of an imaging session) and exposure conditions (e.g., a gain and an exposure time) are fixed. In some imaging applications, a camera temperature may be passively stabilized to a constant, unknown temperature during each imaging session.

For uncooled sensor arrays, correction of hot pixels may be challenging due to a wide range of temperatures and exposure conditions. Active cooling and robust temperature control may not be implemented due to imaging procedure constrains/operating conditions, and it may be cumbersome to perform dark frame subtraction due to a demand that dark frame data used to correct the hot pixels be captured under identical conditions of the imaging scan. For examples of fluorescence microscopy, exposure conditions may be dramatically changed among imaging procedures to compensate for a photonic efficiency of different excitation sources and quantum efficiency of fluorescence dyes. A camera temperature may also be affected by an amount of data communication and computation of pixels, which is related to frame rate. In a 4 k-by-4 k sensor array of a high throughput analysis application, a computational expense of hot pixel correction may become prohibitively large, which slows throughput analysis. Additionally, an ambient temperature and ventilation may affect a final camera stabilized temperature. For example, astronomy imaging includes cooling a camera to a fixed temperature, and integrating final images with multiple images having a fixed exposure time and a fixed gain. Performing dark frame subtraction for these imaging applications may demand that different sets of dark frame data are captured and used to correct hot pixels for multiple possible combinations of temperatures and exposure times. Therefore, it may quickly become prohibitively difficult to perform traditional dark frame correction with a camera that is not temperature controlled.

Alternative methods for hot pixel mitigation at a camera chip level may be provided by correcting a selected group of hot pixels. For example, coordinates of hot pixels may be uploaded to a camera prior to an imaging session, and the affected pixel values may be corrected by camera circuitry prior to output of image data. This may doubly reduce a computation expense: large pixel data read/write overhead may be reduced since pixels are corrected at a camera level, and a few hundreds of pixels may be computed for correction rather than a few millions of pixels. Hot pixel correction performed at the camera level may replace hot pixel values with local statistic derived intensities, such as a mean or a median of the surrounding pixels. Therefore, a number of hot pixels that may be addressed using this method may be restricted to approximately a few thousands pixels. Additionally, hot pixel correction performed in this way may result in data loss at corrected pixels. Therefore, correcting a greater amount of hot pixels may not be desired. On the contrary, under-correction may result in more than desired amount of uncorrected hot pixels in a final image. Further, approximately constant camera temperature and exposure conditions may be demanded for correction of hot pixels using the above described methods. For each new imaging session with changed camera temperature and exposure conditions, a new set of hot pixel coordinates may be uploaded for each imaging session to ensure a validity of correction. Therefore, it is desirable to use some algorithm to identify a selection of hot pixels to correct for each imaging conditions that are "true" hot pixels (e.g., actual occurrences of hot pixels, and not including pixels with high intensity values that may appear as, but are not, hot pixels) so that the total amount of required data and computation effort may be reduced to increase efficiency (e.g., decrease processing time, processing demands, and memory/storage demands).

The present disclosure recognizes and attempts to address disadvantages of existing hot pixel correction methods. Described herein is an adaptive methodology for modeling a sensor response with a parameter model to identify and correct pixels that have an intensity above a certain threshold at various temperatures and exposure conditions to serve as an efficient and effective pixel mitigation strategy, irrespective of imaging conditions. The method described herein for adaptive pixel correction includes treating a number of pixels with intensities above a certain threshold, with their values being replaced by statistics generated from surrounding pixel values. For example, a mean or median value of the nearest four to nine neighboring pixels (e.g., pixels that are in contact with an edge and/or a corner of the identified pixel) may be used to generate the replacement pixel value. Modern camera circuitry is capable of performing this method without use of an external central processing unit (CPU) or a graphics processing unit (GPU). Since an amount of data communication propagating between the camera and additional computation units (e.g., disk, memory, CPU, GPU) is significantly reduced and less pixels are corrected compared to conventional hot pixel correction methods, the imaging task including hot pixel correction may be performed continuously with hot pixel values corrected in real time, without causing a temporal delay in the imaging process.

In one example, the issues described above may be addressed by a method for adaptive pixel correction, comprising: acquiring reference images at different sensor temperatures and/or exposure times; generating a plurality of parameters via identifying a cut-off pixel number using a break-up point between a linear region and a non-linear region of an intensity curve for each reference image; sending coordinates of identified pixels to be corrected to an image sensor; capturing a pixel-corrected image via the image sensor by replacing a pixel intensity at coordinates of the pixels to be corrected with a local statistic intensity; and outputting the pixel-corrected image for display and/or storage.

The above advantages and other advantages, and features of the present description will be readily apparent from the following detailed description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
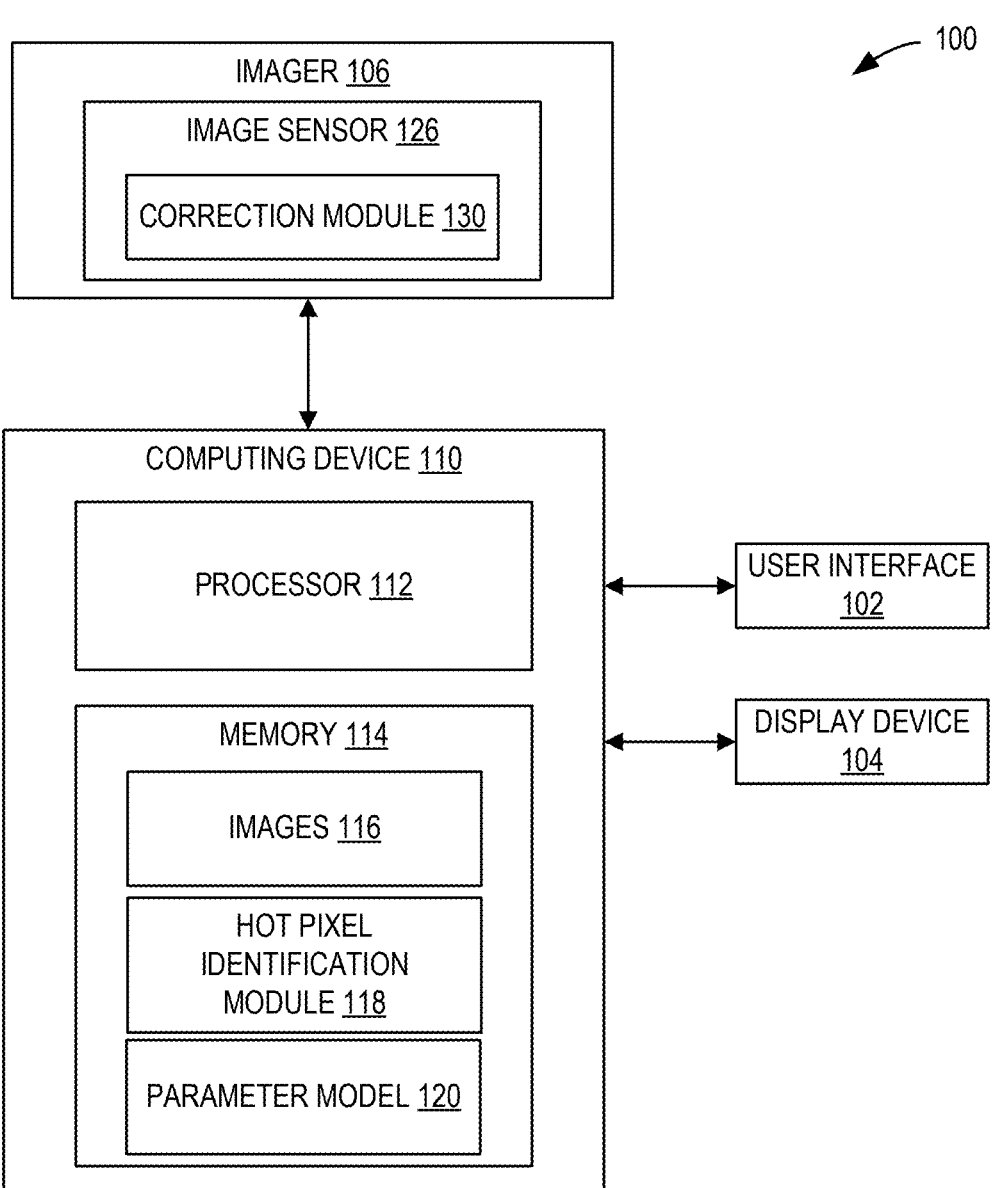
FIG. 1 shows a schematic diagram of an imaging system during a calibration stage.
Figure 2:
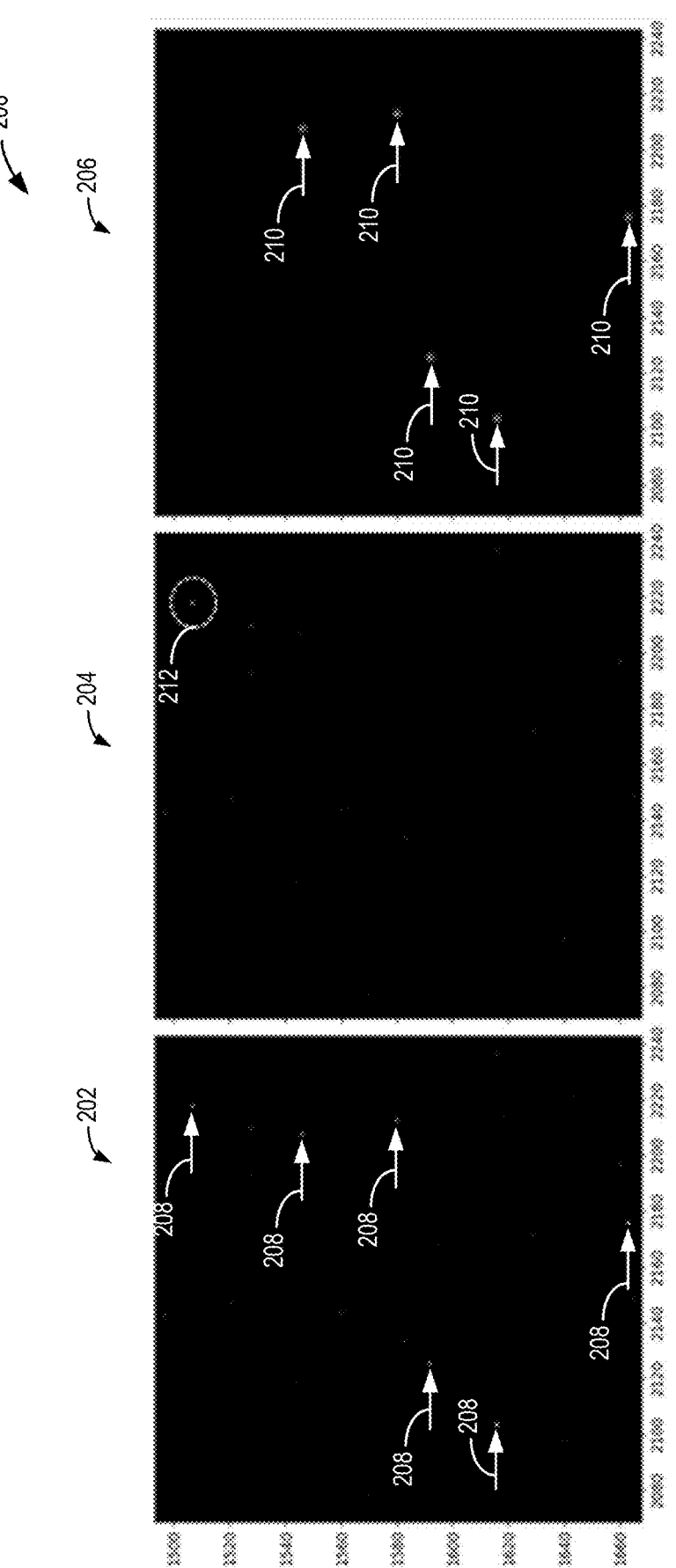
FIG. 2 shows example images, captured by the imaging system of FIG. 1, with and without pixel correction.

The following description relates to adaptive pixel correction of images obtained via imaging techniques and specifically, automatic hot pixel correction of an imaging device. A method for adaptive pixel correction uses a parameter model that illustrates a distribution of pixel brightness/normalized intensity in an imaging field for respective imaging conditions to automatically identify and select hot pixels to be corrected at the given imaging conditions. FIG. 1 shows a schematic of an imaging device that may implement the methods described herein for adaptive pixel correction. A calibration stage of adaptive pixel correction may be executed by a computing device of the imaging system, as described with respect to FIG. 1 and methods of FIGS. 3-4. A correction stage of adaptive pixel correction may be executed by an image sensor of the imaging system, as described with respect to FIG. 12 and methods of FIGS. 3 and 5. Example images captured by the imaging device with and without adaptive pixel correction applied thereto are shown in FIG. 2. FIGS. 6-10 show example graphs of pixel intensity data used to generate a plurality of parameters used by the method for adaptive pixel correction. An example of a parameter model generated using the plurality of parameters is illustrated in FIG. 11.

Turning now to the figures, FIG. 1 shows an exemplary imaging system 100, according to an embodiment. The imaging system 100 includes a computing device 110, which further includes a processor 112 and a memory 114. The processor 112 may comprise one or more computational components usable for executing machine-readable instructions. For example, the processor 112 may comprise a central processing unit (CPU) or may include, for example a graphics processing unit (GPU). The processor 112 may be positioned within the computing device 110 or may be communicatively coupled to the computing device 110 via a suitable remote connection.

The memory 114 may comprise one or more types of computer-readable media, including volatile and/or non-volatile memory. The volatile memory may comprise, for example, random-access memory (RAM), and the non-volatile memory may comprise read-only memory (ROM). The memory 114 may include one or more hard disk drive(s) (HDDs), solid state drives (SSDs), flash memory, and the like. The memory 114 is usable to store machine-readable instructions, which may be executed by the processor 112. The memory 114 is further configured to store images 116, which may comprise digital images captured or created using a variety of techniques, including digital imaging, digital illustration, and more. For example, the images 116 may include images captured using hot pixel correction methods, such that the images 116 may not include hot pixels. Examples of images 116 are described with respect to FIG. 2.

At least a portion of the images 116 may be acquired via an imager 106. The imager 106 may be one or more of a microscopy imaging system (e.g., a light microscope, a fluorescence microscope), a multi-well plate imager, and another type of bioassay imager, for example. The imager 106 may include one or more light sources, including broad and/or narrow spectrum light sources. Examples of broad spectrum light sources include light sources that emit light over a wide wavelength range, such as lamps (e.g., mercury lamps, halogen lamps) that emit light spanning the ultraviolet (UV) and visible ranges. Examples of narrow spectrum light sources include light sources that emit light from a narrow wavelength range or wavelength band, such as light-emitting diodes (LEDs) and lasers. The imager 106 may further include at least one image sensor 126, such as a charge-coupled device (CCD), an electron multiplying CCD (EMCCD), an active pixel sensor (e.g., a complementary metal-oxide-semiconductor, or CMOS, sensor), or another type of sensor that detects light in a location-specific manner, such as in an array-based fashion. Additionally, the imager 106 may include one or more optical coupling devices (e.g., lenses and mirrors), filters, beam splitters, and the like that may be used to direct light of a desired wavelength or wavelength range to a sample being imaged and receive light transmitted by, reflected by, or emitted by (e.g., depending on the imaging modality) the sample at the image sensor(s) 126.

The image sensor 126 is configured to receive information from the computing device 110, such as coordinates of one or more hot pixels in an imaging field captured by the image sensor 126, calculate local statistics of one or more hot pixels, and replace intensities of one or more hot pixels with respective calculated local statistics. Local statistics may be a statistical average or the median value of intensities of surrounding pixels. The image sensor 126 may not include additional memory, and hot pixel coordinates may be over-written in a temporary memory of the image sensor 126 for each imaging condition change. Computations performed by the image sensor 126 to calculate local statistics of one or more hot pixels may be hard wired in a circuitry of the image sensor 126. For example, a correction module 130 may comprise the computations that are hard wired in the circuitry of the image sensor 126. The correction module 130 may be "off" and/or "inactive", such that computations to calculate local statistics and replace hot pixel intensities are not performed, during a calibration stage of the adaptive pixel correction method executed by the imaging system 100. The correction module 130 may be "on", such that computations to calculate local statistics and replace hot pixel intensities are performed, during a correction stage of the adaptive pixel correction method executed by the imaging system 100.

The memory 114 further includes a hot pixel identification module 118, which comprises machine-readable instructions that may be executed by the processor 112 to automatically identify hot pixels of the imager 106, and coordinates thereof. The hot pixel identification module 118 thus contains machine-readable instructions for acquiring reference images using the imager 106 and developing a parameter model 120 based on the reference images. Capturing reference images and developing the parameter model 120 may be referred to herein as the calibration stage of the adaptive pixel correction method. The machine-readable instructions are further executed to identify sensor operating conditions (e.g., of the image sensor 126), and send coordinates of identified hot pixels for identified sensor operating conditions to the image sensor 126. As further described herein, developing the parameter model 120 includes identifying and/or retrieving model parameters obtained by identifying a break-up point between a linear region and a non-linear region of an intensity curve for reference images acquired at different imaging conditions, such as temperatures and/or exposure times. In other examples, imaging conditions may include additional or alternative imaging conditions. The machine-readable instructions stored in the hot pixel identification module 118 may correspond to one or more routines, examples of which are provided with respect to FIGS. 3-5.

Additionally, the memory 114 stores the parameter model 120 that is generated by the hot pixel identification module 118 and used to automatically identify hot pixels, as well as parameters used to generate the parameter model 120. The parameter model 120 may be implemented according to machine-readable instructions stored in the hot pixel identification module 118 and executed by the processor 112. Coordinates of hot pixels that are identified using the parameter model 120 are send from the computing device 110 to the image sensor 126. The image sensor 126 receives the coordinates of the hot pixels, calculates local statistics of the hot pixels, and replaces intensities of each hot pixel with a respective local statistic brightness. Correction of hot pixels by the image sensor 126 may be referred to herein as the correction stage of the adaptive pixel correction method.

The imaging system 100 further includes a user interface 102, which may comprise one or more peripherals and/or input devices, including, but not limited to, a keyboard, a mouse, a touchpad, or virtually any other input device technology that is communicatively coupled to the computing device 110. The user interface 102 may enable a user interact with the computing device 110, such as to select one or more images to evaluate, to select one or more parameters of the image metric, and so forth.

The imaging system 100 further includes a display device 104, which may be configured to display the images 116. In some examples, the display device 104 may further be used to display possible parameter options and selections related to adaptive pixel correction, including one or more break-up points, one or more reference images, and/or the parameter model, for example. The user may select or otherwise input parameters via the user interface 102 based on options displayed via the display device 104.

The imaging system 100 may be communicably coupled to one or more third-party devices, not shown in FIG. 1. For example, the imaging system 100 may be communicably coupled to a database via a wired and/or a wireless connection, where the database is configured to store images captured by the imaging system 100.

FIG. 2 shows example images 200 captured by an imaging system, such as the imaging system 100 of FIG. 1, with and without adaptive pixel correction. The adaptive pixel correction process may be applied to an image sensor of an imaging system (e.g., the image sensor 126) prior to image capture. In this way, images captured by the imaging system are corrected for hot pixels (e.g., the image may not include hot pixels after correction) without first capturing an uncorrected image. Briefly, adaptive pixel correction includes two stages: a calibration stage and a correction stage. The calibration stage includes generating a parameter model that identifies coordinate locations of hot pixels in an imaging field of the image sensor at different exposure times and sensor temperatures. During the calibration stage, the correction module of the image sensor is off, and hot pixels are not corrected by the image sensor. The correction stage includes identifying present exposure and sensor temperature conditions, identifying corresponding hot pixel coordinates using the parameter model, and sending hot pixel coordinates from the computing device to the image sensor. The correction module of the image sensor is on. The image sensor receives the hot pixel coordinates and performs calculations to replace intensities of the identified hot pixels. The image sensor calculates a corrected pixel brightness as a calculated local statistic brightness that replaces a pixel brightness at the coordinates of each hot pixel. No calculations may be performed by the computing device during the correction stage. A resulting final captured image is thus automatically corrected for hot pixels without user input.

Each of a raw image 202, a hot pixel-corrected image 204, and an annotated image 206 show an imaging field (e.g., the same imaging field) captured by an imaging system. The raw image 202 is captured by the imaging system without adaptive pixel correction. The hot pixel-corrected image 204 is captured by the imaging system using adaptive pixel correction. The annotated image 206 shows flagged hot pixels in the imaging field, where the flagged hot pixels may be identified by the adaptive pixel correction method. In the example images of FIG. 2, the imaging field is shown on a coordinate grid numbered in pixels along a vertical axis and a horizontal axis.

The raw image 202 comprises a plurality of hot pixels, indicated by arrows 208. The arrows 208 are included in FIG. 2 for illustrative purposes to indicate each hot pixel, and may not be included in the raw image 202 in practical examples. The plurality of hot pixels in the raw image 202 are true hot pixels that are present in the image sensor of the imaging system. The number of hot pixels is relatively low, compared to a total number of pixels in the imaging field. However, a result of the plurality of hot pixels in a final image captured by the imaging system may be an inaccurate representation of the imaging subject due to the isolated high brightness of each hot pixel. For example, in dark-field imaging (e.g., astronomy imaging, fluorescence microscopy), bright pixels and intensity values carry significant information with a majority of the pixels of the imaging field being dark. Therefore, even a relatively small amount of residual or untreated/uncorrected pixels may distort a phenomenon to be captured by the imaging system. Alternatively, if a hot pixel threshold intensity for correction is set too low, some legitimate bright pixels (e.g., not hot pixels, but true brightness in the imaging subject) may be misidentified as hot pixels and replaced according to a conventional method for hot pixel correction. This may result in blurring or otherwise losing information of the corresponding pixel. Therefore, it is desirable to specify an intensity threshold indicating hot pixels to be removed that maximizes an effectiveness of hot pixel mitigation and minimizes unintended consequences of over correction and undesirable removal of bright pixels.

The flagged hot pixels are indicated by arrows 210 in the annotated image 206. The flagged hot pixels may be automatically identified and corrected by the adaptive pixel correction method. In the hot pixel-corrected image 204, the identified hot pixels (e.g., shown in the annotated image 206) are corrected, and thus not present in the hot pixel-corrected image 204. The annotated image 206 is shown in FIG. 2 for illustrative purposes and may not be generated and/or output for display by the method for adaptive pixel correction described herein. The flagged hot pixels in the annotated image 206 include some, but not all of, the plurality of hot pixels of the raw image 202 (e.g., the true hot pixels).

The hot pixel-corrected image 204 may be captured using the adaptive pixel correction method, where hot pixels having intensities above a break-up value are automatically identified prior to capturing the image, and are corrected by the image sensor. As further described herein, the method for adaptive pixel correction includes identifying a break-up point to be used at different imaging conditions to differentiate between hot pixels to correct and hot pixels to not correct. A residual hot pixel in the hot pixel-corrected image 204 that was not corrected using the adaptive pixel correction process is marked by a dotted circle 212. The residual hot pixel is not corrected using the adaptive pixel correction process, and thus is visible in the hot pixel-corrected image 204, because an intensity of the residual hot pixel is below the break-up point identified in the parameter model for the present imaging conditions (e.g., sensor temperature and exposure time). In some implementations of adaptive pixel correction, a hot pixel-corrected image may include more than one or less than one residual hot pixel. The hot pixel-corrected image 204 may be output for display on a display device (e.g., the display device 104 of FIG. 1), stored in a memory (e.g., the memory 114 of FIG. 1), and/or output to a third-party device that is communicably coupled to the imaging system.

Figure 3:
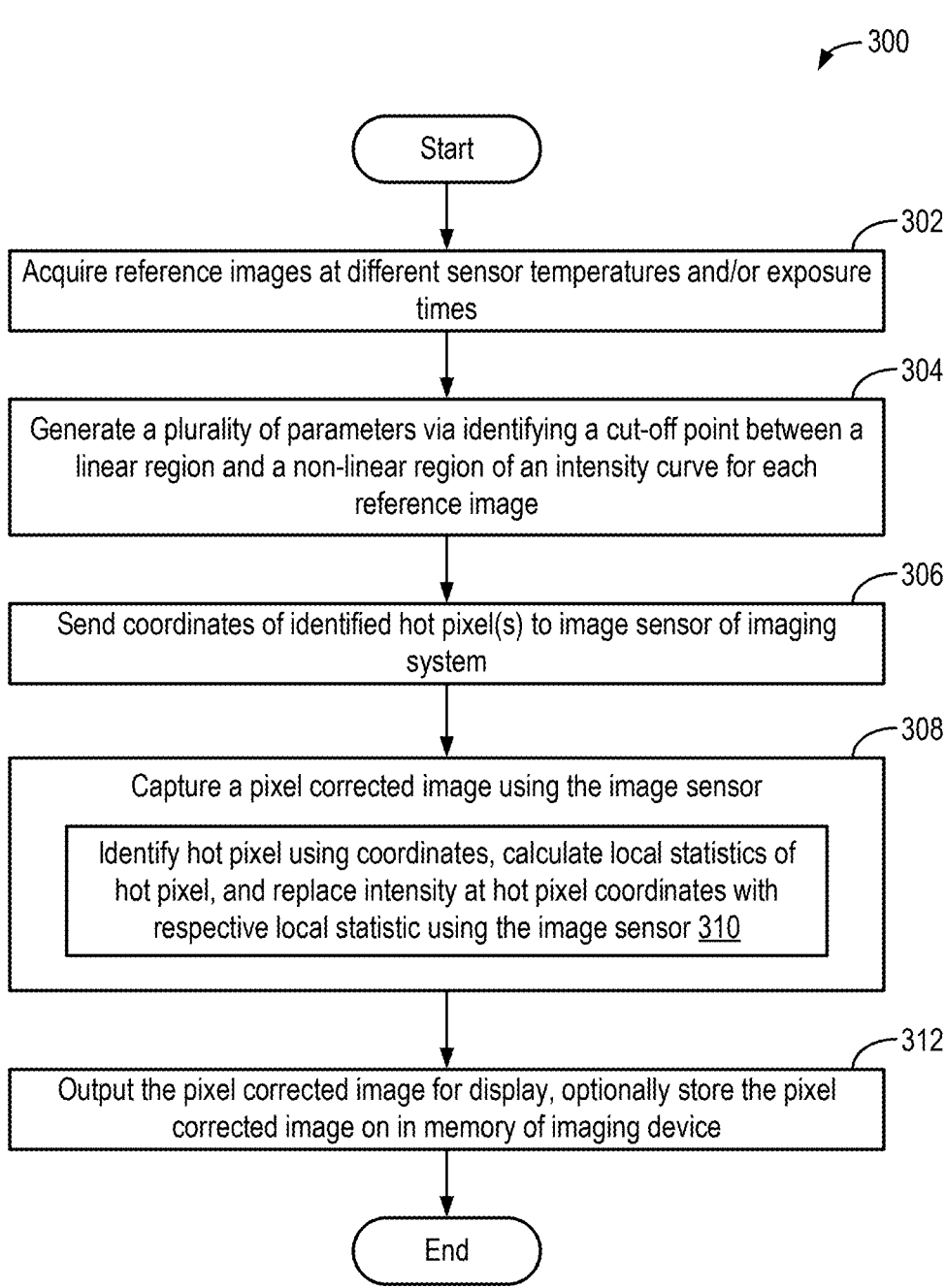
FIG. 3 shows a flow diagram of a method for adaptive pixel correction.

FIG. 3 shows a method 300 for adaptive pixel correction, according to an embodiment. The method 300 and the rest of the methods included herein may be executed at least in part by a processor of a computing device, such as the processor 112 of the imaging system 100 of FIG. 1, according to instructions stored in a non-transitory memory of the computing device (e.g., within the hot pixel identification module 118 of the memory 114). Some elements of the method 300 and the rest of the methods described herein may be executed by additional parts of the imaging system 100, including the image sensor 126. The method 300 includes both the calibration stage and the correction stage of adaptive pixel correction.

The method 300 begins with the calibration stage, where the correction module of the imaging sensor is off. At 302, the method 300 includes acquiring reference images at different sensor temperatures and/or exposure times, collectively "imaging conditions". The imaging sensor captures ground truth pixel data (e.g., "raw data") and does not correct for hot pixels in these captured reference images. Imaging procedures may be performed at different imaging conditions to capture different types of imaging subjects and/or capture different images. Hot pixels may be present in different coordinate locations and/or at different intensities at different imaging conditions. Therefore, acquiring reference images at different sensor temperatures and/or exposure times may provide information about a presence or lack thereof of hot pixels in different imaging conditions. Some reference images may be acquired at a fixed sensor temperature and a variable exposure time, and further reference images may be acquired at a fixed exposure time and a variable sensor temperature, such that a set of reference images used to generate a plurality of parameters to be used for pixel correction represent a broad range of imaging conditions that may be used by the imaging system to capture an image. In some examples, some reference images may be acquired at a fixed sensor temperature and a fixed exposure time with both values randomly changed and distributed within the ranges of sensor temperature and exposure time of the imaging sensor. Such so-called unstructured data may be used to model the 3D model with modern numerical modeling techniques. The reference images are sent from the image sensor to the computing device to be processed.

Figure 6:
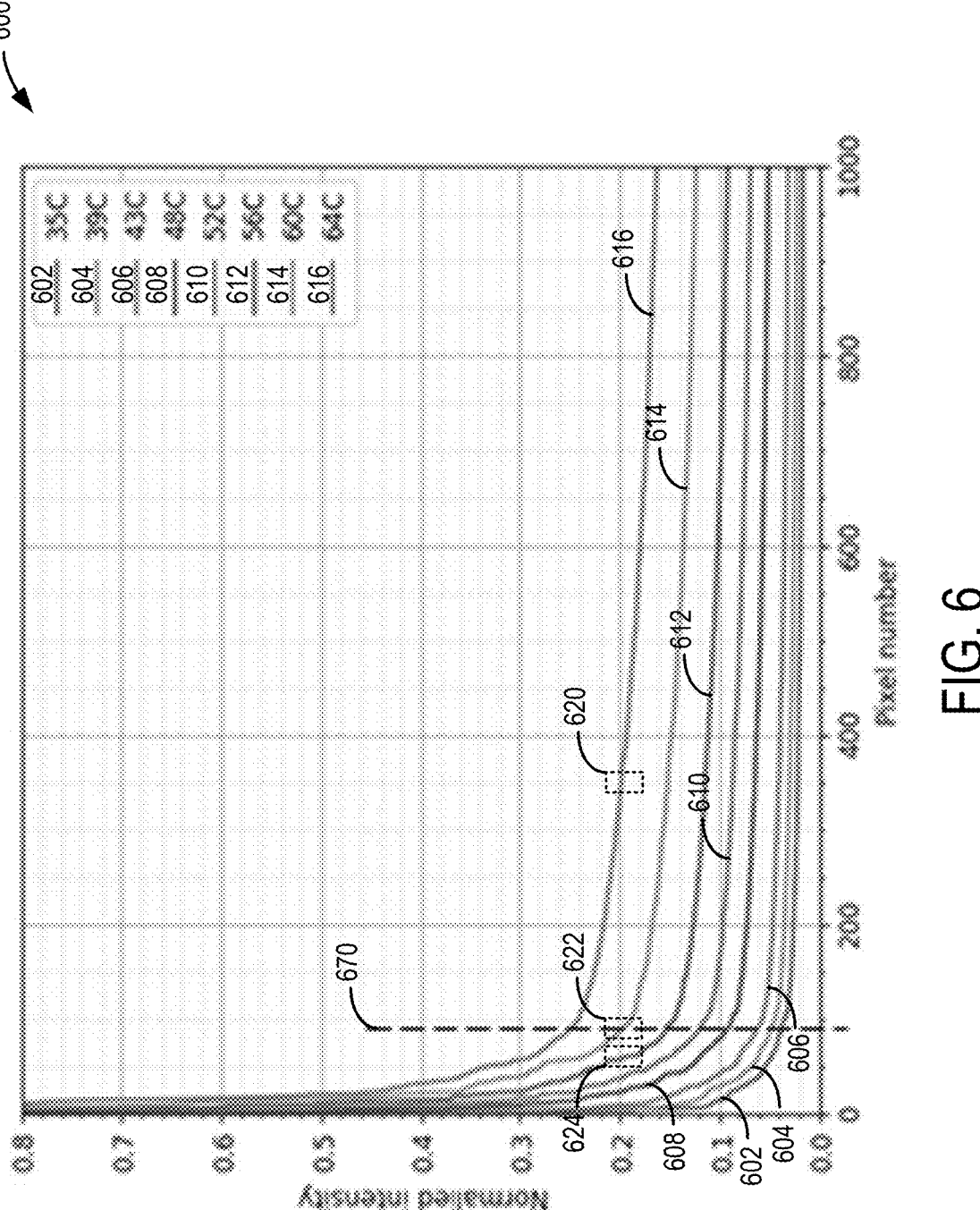
FIG. 6 shows plots illustrating pixel intensity distribution under various sensor temperature conditions.
Figure 7:
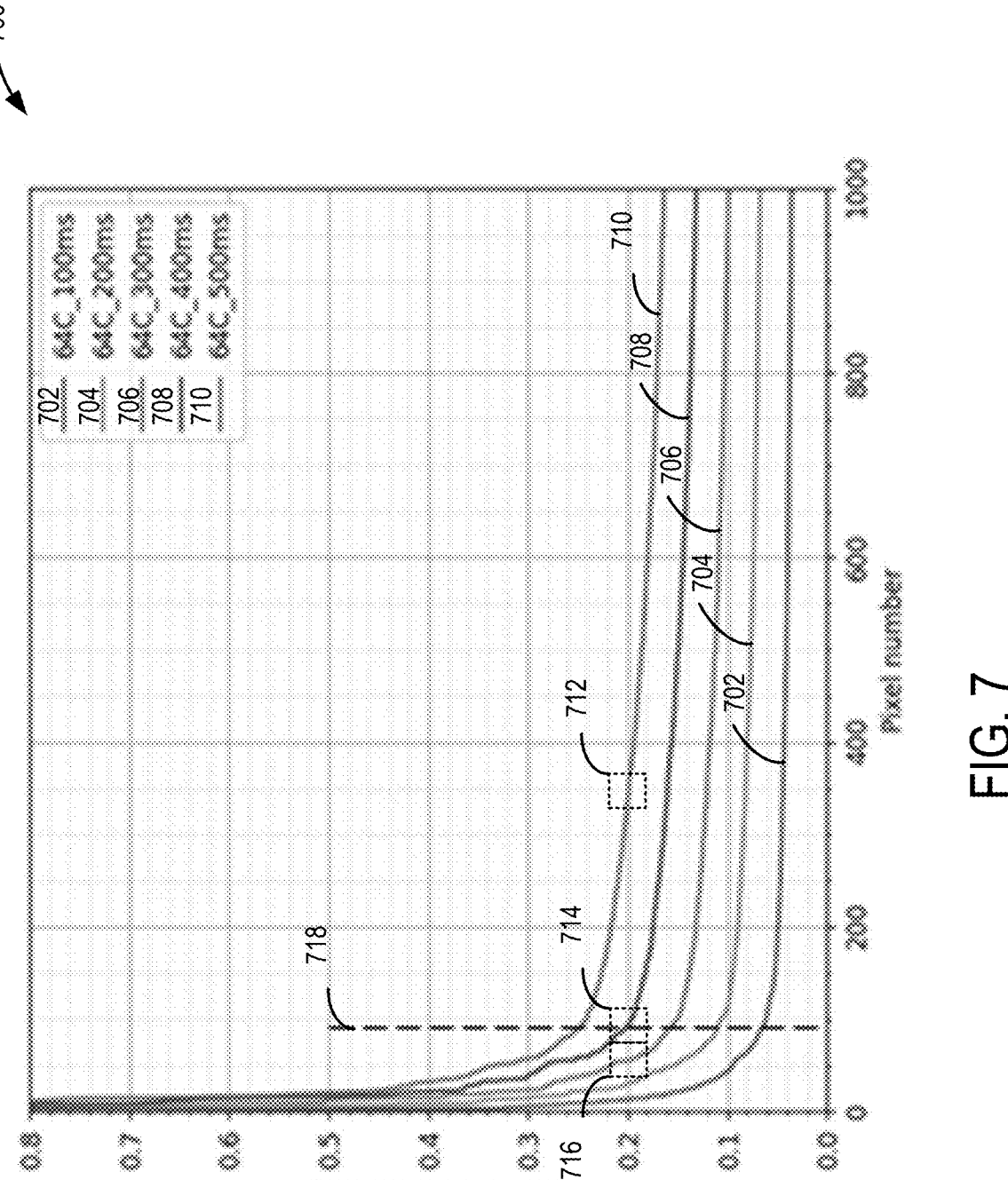
FIG. 7 shows plots illustrating pixel intensity distribution under various sensor exposure time conditions.

At 304, the method 300 includes generating a plurality of parameters via identifying a break-up point between a linear region and a non-linear region of an intensity curve for each reference image. The plurality of parameters provides a parameter model (e.g., the parameter model 120) of a dependency of linear region parameters, such as slope and y-intercept, of a pixel intensity curve on thermal (e.g., sensor temperature) and temporal (e.g., exposure time) conditions. Briefly, each reference image is processed to generate an intensity distribution of pixel intensities for each reference image. The break-up point in the intensity distribution is identified. The break-up point is a transition in the intensity distribution, where a first region of the intensity distribution may be modeled using a linear model, and a second region of the intensity distribution may be modeled using a non-linear (e.g., exponential) model. A region below (e.g., to the left of, as shown in FIGS. 6 and 7) the break-up point is the non-linear region, and includes pixels having intensities defined herein as being above a desired threshold intensity, and thus being hot pixels. Using the break-up point, a cut-off pixel number is identified, where the cut-off pixel number provides a threshold below which (e.g., in the non-linear region of pixel intensity) pixels to be corrected are identified. The operation 304 is performed for each reference image, thus intensity distribution curves are generated and cut-off pixel numbers are identified for a broad range of sensor temperatures and exposure times. A parameter model (e.g., the parameter model 120) is generated, where the parameter model provides coordinate locations of one or more hot pixels for different operating conditions, as identified using each of the intensity distribution curves. The coordinates illustrate a coordinate location of one or more pixels to be corrected in an imaging field for given imaging conditions (e.g., pixel numbers that are equal to or less than the cut-off pixel number). The parameter model is stored in the memory of the computing device.

Following generation of the parameter model in the calibration stage, the correction stage may be executed to automatically identify and correct hot pixels. The correction module of the imaging sensor is turned on. The computing device may not perform additional calculations in the correction stage. At 306, the method 300 includes sending coordinates of one or more identified hot pixels to the image sensor of the imaging system. The coordinates may be identified by the computing device using the plurality of parameters generated at operation 304. For example, the plurality of parameters is used to differentiate among true hot pixels, saturated pixels, and pixels that show a true brightness in the image. Additionally, the computing device may receive information about sensor conditions, including the exposure time and the sensor temperature, via the user interface and/or the imager. The computing device references the parameter model (e.g., generated at operation 304) to identify coordinate locations of hot pixels for the present sensor temperature and exposure time. Coordinate locations of true hot pixels for the present sensor temperature and exposure time are sent from the computing device to the image sensor.

At 308, the method 300 includes capturing a pixel-corrected image using the image sensor. The computing device may receive a command (e.g., via a user interface and/or another device communicably coupled to the computing device) directing the imaging system to capture an image. Capturing the image includes using the image sensor to capture the pixel-corrected image. At 310, the method 300 includes identifying one or more hot pixels using the coordinates sent to the image sensor, calculating local statistics at each coordinate location (e.g., each set of coordinates received from the computing device), and replacing an intensity at each coordinate location with a respective local statistic brightness. Local statistics may be a statistical average or the median value of intensities of surrounding pixels. For example, the corrected pixel intensity may be a statistical average of intensities of four pixels or nine pixels immediately surrounding (e.g., directly adjacent and/or diagonal to, without another pixel therebetween) the pixel to be corrected.

The operation 310 is performed by the image sensor during image capture. For example, instructions for receiving coordinates of the hot pixels(s), calculating local statistics of the hot pixel(s), and replacing an intensity at the coordinate location with the respective local statistic may be hard wired in a circuitry of the image sensor (e.g., the correction module 130). In this way, the image sensor provides corrected intensities at identified pixel locations for the present sensor operating conditions. Intensity information from all other pixels in the imaging field may be captured according to conventional imaging methods. By sending coordinates of identified hot pixels from the computing device to the image sensor, and having the image sensor itself calculate and perform intensity corrections at the received coordinates, a processing time may be reduced and network traffic may be reduced, compared to methods for pixel intensity correction that include capturing an image, sending the image to a computing device, correcting the image at the computing device, and outputting a corrected image. As further described herein, sending coordinates of identified hot pixels to the image sensor prior to image capture enables a corrected image to be captured without first capturing an uncorrected image and later generating a corrected image from the uncorrected image. The local statistics for hot pixel intensity correction may be calculated during image capture, therefore the method may have decreased storage demands compared to methods for image correction that include identifying and storing image corrections prior to image capture.

At 312, the method 300 includes outputting the pixel-corrected image for display on a display device (e.g., the display device 104) and, optionally, storing the pixel-corrected image in the memory of the imaging device. The pixel-corrected image may be sent from the imager to one or more of the memory 114 of the computing device 110 (e.g., to store images 116). The pixel-corrected image may further be sent to a third-party device, such as a database for storing images. The method 300 ends.

Figure 12:
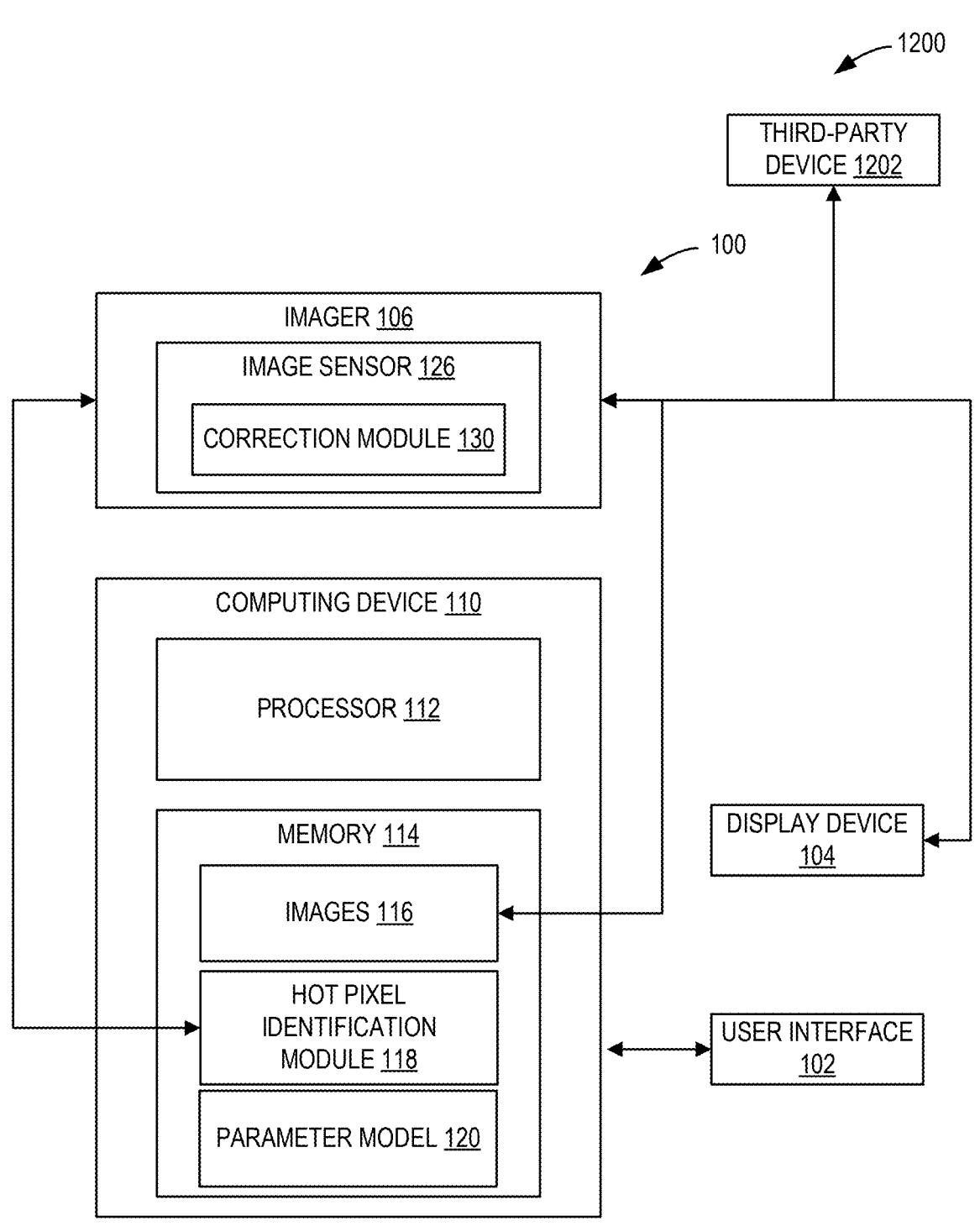
FIG. 12 shows a schematic diagram of the imaging system of FIG. 1 during a correction stage.

Turning to FIG. 12, a schematic diagram 1200 of the imaging system 100 of FIG. 1 is shown during a correction stage. The schematic diagram 1200 includes elements described with respect to FIG. 1 that may not be reintroduced, for brevity. During the correction stage, the correction module 130 is on. The computing device 110 may receive the exposure time from the user interface 102. The sensor temperature may be identified by the imager 106. The hot pixel identification module 118 sends coordinate locations of pixels identified for the present sensor temperature and exposure time, using the parameter model, to the image sensor 126. The image sensor 126 receives the coordinates, calculates intensity corrections for each coordinate location, and replaces the corresponding pixel intensity. The pixel-corrected image is sent to one or more of the memory 114 of the computing device 110 (e.g., to be stored as images 116), the display device 104, and/or a third-party device 1202 for storage and/or processing.

Figure 4:
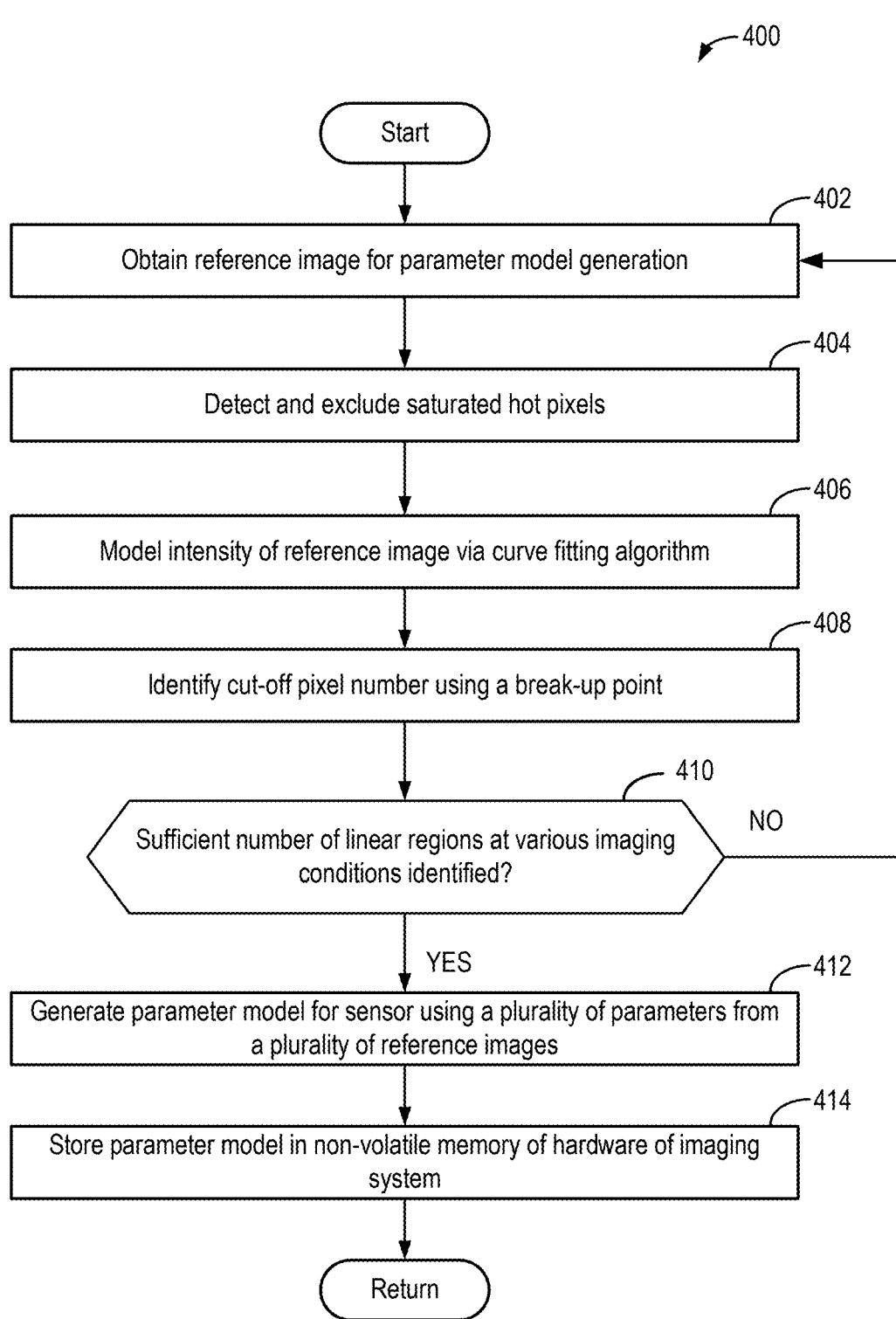
FIG. 4 shows a flow diagram of a method for a calibration stage of the method for adaptive pixel correction of FIG. 3.

FIG. 4 shows a flow chart of a method 400 for generating a plurality of parameters used for adaptive pixel correction, for example, as described with respect to calibration stage of the method 300. Parameters may be used to generate the parameter model, which is stored in a memory of the imaging system. Steps of the method 400 may be performed on a series of reference images acquired at different operating conditions, such as different sensor temperatures and/or exposure times, to investigate and generate a parameter model for the imaging system illustrating sensor condition dependencies. The method 400 may in part describe operations 302 and 304 of the method 300 in further detail.

At 402, the method 400 includes obtaining a reference image for parameter model generation. As briefly described above, a reference image may be an image of an imaging field captured at a reference set of sensor operating conditions. For example, a first set of reference images may be captured at a fixed sensor temperature and at varying exposure times. A second set of reference images may be captured at a fixed exposure time and at varying sensor temperatures. A third set of reference images may be captured at unfixed exposure times and unfixed sensor temperatures. The first, second, and third set of reference images may be used to identify parameters used to generate the parameter model, as further described herein with respect to the method 500 and FIGS. 6-11.

At 404, the method 400 includes detecting saturated pixels with a maximum intensity and excluding saturated pixels from the parameter modeling process. The maximum intensity of the reference image is a maximum possible intensity value specified by a number of bits of the image (e.g., 255 for 8-bit image). Saturated pixels may be defined as pixels having an intensity that is equal to the maximum intensity. The saturated pixels may be automatically removed from a pixel intensity dataset for the reference image.

At 406, the method 400 includes modeling pixel intensities of the reference image using a curve fitting algorithm. An intensity distribution curve may be generated from the pixel intensity dataset, examples of which are shown in FIGS. 6-10. Generating the intensity distribution curve comprises numbering each pixel of the reference image, and sorting pixels by intensity. The intensity distribution curve sorts pixel data by normalized intensity (e.g., relative pixel intensity with respect to the maximum intensity of the reference image), and not by pixel location. A coordinate location of each pixel is stored with the corresponding pixel number, thus when pixels of the intensity distribution curve are identified, the coordinate location of the pixel in the image field may be easily identified, and the pixel may be corrected.

Modeling the intensity of the reference image further includes applying the curve fitting algorithm to the intensity distribution curve to identify a break-up point between a linear region and a non-linear region of the intensity distribution curve. As further described with respect to FIG. 8, the intensity distribution curve may include rapid slope changes at a "knee", where a slope of the intensity distribution curve before (e.g., to the left of) the knee may be modeled using one or multiple non-linear (e.g., exponential) models, and a slope of the intensity distribution curve after (e.g., to the right of) the knee may be modeled using a linear model. A number of pixels with a relatively high intensity value is significantly greater in the non-linear region, compared to the linear region. For example, 90 pixels may have a relatively high normalized intensity, and 910 pixels may have a relatively low normalized intensity for a given sensor temperature, as further described with respect to FIG. 6.

A machine learning model, such as a decision tree algorithm, may be used to analyze slopes of regions of the intensity distribution curve and define a first, non-linear region and a second, linear region, of the intensity distribution curve. The decision tree algorithm may repeat a binary process in an iterative fashion to identify a first linear region and a connecting non-linear region. The curve fitting algorithm is used to identify the break-up point, which indicates a junction or transition between the linear region and the non-linear region of the intensity distribution curve.

At 408, the method 400 includes identifying a cut-off pixel number based on the break-up point. As briefly described with respect to the method 300, the cut-off pixel number provides a threshold below which (e.g., in the non-linear region of pixel intensity) pixels to be corrected are identified. The cut-off pixel number may be identified as a larger pixel number than the pixel number of the break-up point to ensure the slope value identified as the transition between the linear slope and the non-linear slope by the decision tree algorithm is a true linear slope. The break-up point is a point on the slope where a moving average slope magnitude is smaller than a predicted slope value (e.g., the slope value predicted by a linear fit model). The cut-off pixel number, for example, may be identified as a pixel number that is one number greater than the pixel number of the break-up point. Further detail regarding the break-up point and the cut-off pixel number is described with respect to FIG. 8.

At 410, the method 400 includes determining if a sufficient number of linear regions at various imaging conditions have been identified. For example, a single linear region may be identified from each reference image. A plurality of reference images may be obtained to capture pixel intensity distributions of the image sensor at different imaging conditions (e.g., sensor temperature and exposure time). The sufficient number of linear regions may be a number of linear regions from which a y-intercept and a slope of each linear region may be modeled to illustrate a dependency of linear region parameters, such as slope and y-intercept, of a pixel intensity curve on sensor temperature and/or exposure time for the image sensor. If a sufficient number of linear regions have not been identified, the method 400 returns to 402 to obtain one or more additional reference image(s) at additional variation of imaging conditions. The decision criterion will be based on the prediction error of the 3D dependency model, which will be discussed later.

If a sufficient number of linear regions have been identified, the method 400 proceeds to 412. At 412, the method 400 includes generating a parameter model for the image sensor using the plurality of parameters from the plurality of reference images. As described above, the intensity distribution model of each reference image is modeled as a linear region and a non-linear region, where the break-up point is positioned at a transition between the linear region and the non-linear region, and the cut-off pixel number is positioned in the linear region. A slope and a y-intercept of each linear region may be identified and plotted with respect to a variable sensor condition (e.g., sensor temperature or exposure time) to identify a dependency of linear region parameters, such as slope and y-intercept, of a pixel intensity curve on the respective sensor condition and, more specifically, to identify a dependency of identified cut-off pixel number on the respective sensor condition. Further detail regarding modeling of the slope and y-intercept of linear regions is described with respect to FIGS. 9 and 10.

The parameter model may be generated using the models of slope and y-intercept for a broad range of imaging conditions that may be experienced by the image sensor. The parameter model may be a single, 3D model that illustrates dependency of linear region parameters, such as slop and y-intercept, on both image sensor temperature and exposure time. The linear region parameters may be derived from the 3D models and used to establish linear dependency of the hot pixel intensity on the sensor conditions (e.g., temperature and exposure time). Each reference image of the plurality of reference images may have a single variable sensor condition (e.g., either sensor temperature or exposure time). The parameter model simultaneously provides information about sensor temperature and exposure time, such that the parameter model may be referenced using known imaging conditions to identify a cut-off pixel number to be used to pixel correction. An example 3D parameter model is described with respect to FIG. 11.

At 414, the method 400 includes storing the parameter model in a non-volatile memory of hardware of the imaging system. The parameter model may be stored in a memory of the image sensor, a memory of the imager, and/or a memory of the computing device (e.g., as described with respect to FIG. 1). As described with respect to FIG. 3, the parameter model may be referenced during an imaging scan, prior to image capture, to automatically identify and implement pixel corrections that correspond to present imaging conditions, such that a corrected image is captured by the imaging system. The method 400 ends.

Figure 5:
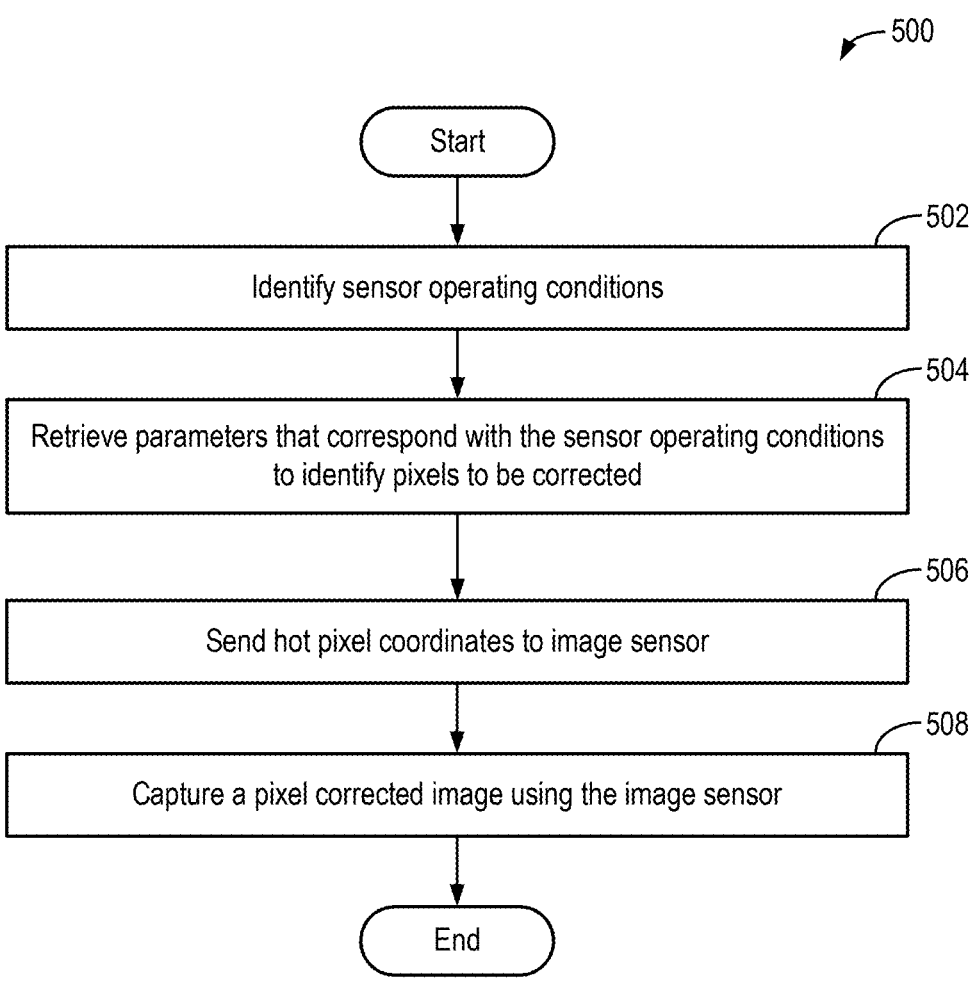
FIG. 5 shows a flow diagram of a method for a correction stage of the method for adaptive pixel correction of FIG. 3.

FIG. 5 describes a method 500 for capturing a pixel-corrected image using the parameter model stored in the imaging system, as described with respect to the correction stage of the method 300 of FIG. 3. The parameter model 120 may not be generated for each implementation of the pixel correction method, and may instead be referenced to determine pixel coordinates for different sensor conditions. The method 500 may thus be implemented in imaging scans following execution of the calibration stage of the imaging system.

At 502, the method 500 includes identifying sensor operating conditions. As described above, different sensor operating conditions including different sensor temperatures and/or different exposure times may be used to capture different types of images and/or different imaging subjects. Sensor operating conditions may be input by a use via a user interface (e.g., the user interface 102 of FIG. 1), and/or may include environmental conditions that influence the imaging conditions. For example, the user may input a desired sensor temperature that is less than an environmental temperature, and the imaging system may be configured with a fan or other cooling device to cool the sensor temperature to the desired sensor temperature. In other examples, the imaging system may or may not include a cooling device or heating device to control the sensor temperature, and the sensor temperature may be automatically detected by a sensor of the imaging system. Additionally or alternatively, an exposure time used by the imaging system to capture the image may be input by a user and/or may be automatically set in response to a selected imaging procedure.

At 504, the method 500 includes retrieving parameters from the plurality of parameters that correspond with the sensor operating conditions to identify pixels to be corrected. As described with respect to the method 300, the plurality of parameters and/or the parameter model of a dependency of linear region parameters, such as slope and y-intercept, of a pixel intensity curve on thermal (e.g., sensor temperature) and temporal (e.g., exposure time) conditions provided by the plurality of parameters may be stored in a memory of the imaging system (e.g., the memory 114). As further described with respect to FIGS. 4-11, the plurality of parameters and/or the parameter model provided thereby illustrate cut-off pixel numbers for pixel correction at different sensor operating conditions. Thus, retrieving parameters that correspond with the sensor operating conditions identified at operation 502 provides one or more pixels to be corrected (e.g., one or more pixel corrections). For example, the cut-off pixel number for the present imaging conditions may be identified from the plurality of parameters (e.g., the break-up point of the pixel intensity distribution), and a set of coordinates for one or more pixels indicated as being equal to or less than the cut-off pixel number are provided.

At 506, the method 500 includes sending hot pixel coordinates from the computing device to the image sensor. As described with respect to the method 300 of FIG. 3, a model of pixel corrections identified for all imaging conditions may be stored in a memory of the imaging system (e.g., the memory 114) and, in response to identifying sensor operating conditions prior to image capture, the parameter model may be accessed and coordinates of pixels to be corrected for the present imaging conditions may be output to the image sensor.

At 508, the method 500 includes capturing a pixel-corrected image using the image sensor, as described with respect to FIG. 3. Pixel corrections that correspond to the identified sensor operating conditions are thus automatically implemented during image capture, and a pixel-corrected image is provided without first capturing and correcting a raw, uncorrected image (e.g., that includes hot pixels). Method 500 ends.

FIGS. 6-10 show example graphs of pixel intensity data used to generate a plurality of parameters used by the method for adaptive pixel correction. FIG. 6 shows a first graph 600 illustrating distribution curves of pixel values in reference images (e.g., dark frame images) of an imaging frame captured at various temperatures. An exposure time used to capture the data of the first graph 600 may be fixed. A first plot 602 of the first graph 600 shows distribution of pixel values in an image captured at a sensor temperature of 35 degrees Celsius (° C.). Subsequent plots show distributions of pixel values of images captured at other sensor temperatures: a second plot 604 at a sensor temperature of 39° C., a third plot 606 at a sensor temperature of 43° C., a fourth plot 608 at a sensor temperature of 48° C., a fifth plot 610 at a sensor temperature of 52° C., a sixth plot 612 at a sensor temperature of 56° C., a seventh plot 614 at a sensor temperature of 60° C., and an eighth plot 616 at a sensor temperature of 64° C.

The eighth plot 616 shows that approximately 340 pixels have intensities that are at least 20% of a full intensity (0.2 normalized intensity) when the sensor temperature is 64° C., as outlined by a dashed line box 620. A number of pixels that have intensities that are at least 20% of the full intensity is reduced to approximately 90 pixels when the sensor temperature is 60° C. (e.g., in the seventh plot 614), as outlined by a dashed line box 622. An additional sensor temperature reduction by 4 degrees to 56° C. (e.g., the sixth plot 612) reduces the number of pixels with intensity values of at least 20% of the full intensity to approximately 60 pixels, as outlined by a dashed line box 624. As sensor temperature increases, more pixels have intensities of at least 20% of the full intensity; at higher sensor temperatures, there may be more hot pixels present in the image than in images captured at lower sensor temperatures. The plots of the first graph 600 illustrate intensity-sorted pixel distributions in such a way that may assist in identifying break-up points for adaptive pixel correction at different temperatures, as further described with respect to FIGS. 8-11.

FIG. 7 shows a second graph 700 illustrating distribution curves of pixel values in reference images (e.g., dark frame images) of an imaging frame captured at various exposure times, in milliseconds (ms). A sensor temperature used to capture data of the second graph 700 may be fixed. For example, the sensor temperature is 64° C. A first plot 702 of the second graph 700 shows distribution of pixel intensity values in an image captured at an exposure time of 100 ms. Subsequent plots of the second graph 700 show distributions of pixel intensity values of images captured at other exposure times: a second plot 704 at an exposure time of 200 ms, a third plot 706 at an exposure time of 300 ms, a fourth plot 708 at an exposure time of 400 ms, and a fifth plot 710 at an exposure time of 500 ms.

The fifth plot 710 shows that approximately 350 pixels have an intensity of at least 20% of a full intensity when the exposure time is 500 ms, as outlined by a dashed line box 712. A number of pixels with an intensity value that is at least 20% of full intensity is reduced to approximately 90 pixels when the exposure time is decreased to 400 ms (e.g., in the fourth plot 708), as outlined by a dashed line box 714. An additional exposure time decrease to 300 ms (e.g., in the third plot 706) reduces the number of pixels with an intensity value of at least 20% of full intensity to approximately 60 pixels, as outlined by a dashed line box 716. As exposure time increases, more pixels have an intensity of at least 20% of the full intensity; in images captured using a longer exposure time, there may be more hot pixels present than in images captured at shorter exposure times. The plots of the second graph 700 illustrate intensity-sorted pixel distributions in such a way that may assist in identifying break-up points for adaptive pixel correction at different exposure times, as further described with respect to FIGS. 8-11.

Conventional methods for pixel correction may use a threshold intensity value to define pixel intensities as hot pixels, and thus identify pixels to be corrected. However, as shown in FIGS. 6 and 7, a single intensity threshold may be insufficient to define hot pixel intensity distribution at different imaging conditions. For example, using a threshold of 0.2 normalized intensity to differentiate between hot pixels and normal pixels may be insufficient, as a number of hot pixels (e.g., pixels having an intensity greater than the threshold) may be temperature and/or exposure time dependent, and a different threshold value may be desired to achieve a similar amount of pixel correction across all imaging conditions. Thus, another method for identifying a break-up point is desired.

Differences in pixel intensity distributions illustrated in the first graph 600 of FIG. 6 and the second graph 700 of FIG. 7 are due to rapid slope changes at a "knee" of each distribution curve. At the knee, a slope of the distribution curve transitions from being modeled as a non-linear (e.g., an exponential) curve to being modeled as a linear slope. Curve fitting may be applied to each distribution curve to identify the knee, also referred to herein as the break-up point. As further described with respect to FIG. 8, the break-up point illustrates a transition point between the linear-modeled region and the non-linear-modeled region of the distribution curve. The break-up point may be different for different imaging conditions, and may be used to identify pixel corrections for different imaging conditions. A vertical dashed line 670 and 718 in each of the first graph 600 and the second graph 700, respectively, illustrates an approximate knee area intersection of each plot. The knee area (e.g., illustrating the break-up point) is imaging condition dependent. The vertical dashed lines 670 and 718 are included as a visual aid to show approximate locations. An intercept of the vertical dashed line 670, 718 and a respective plot may illustrate a break-up point for intensity curve modeling. To a left side of the vertical dashed line 670, or 718, the distribution curve slopes are more rapidly changing, and may be modeled using exponential decay models, compared to distribution curve slopes to a right side of the vertical dashed line 670, or 718, where the distribution curve slopes may be fit with a linear model. The knee area may be used to identify a break-up point below which (e.g., in the non-linear region of pixel intensity) pixels to be corrected are identified.

Figure 8:
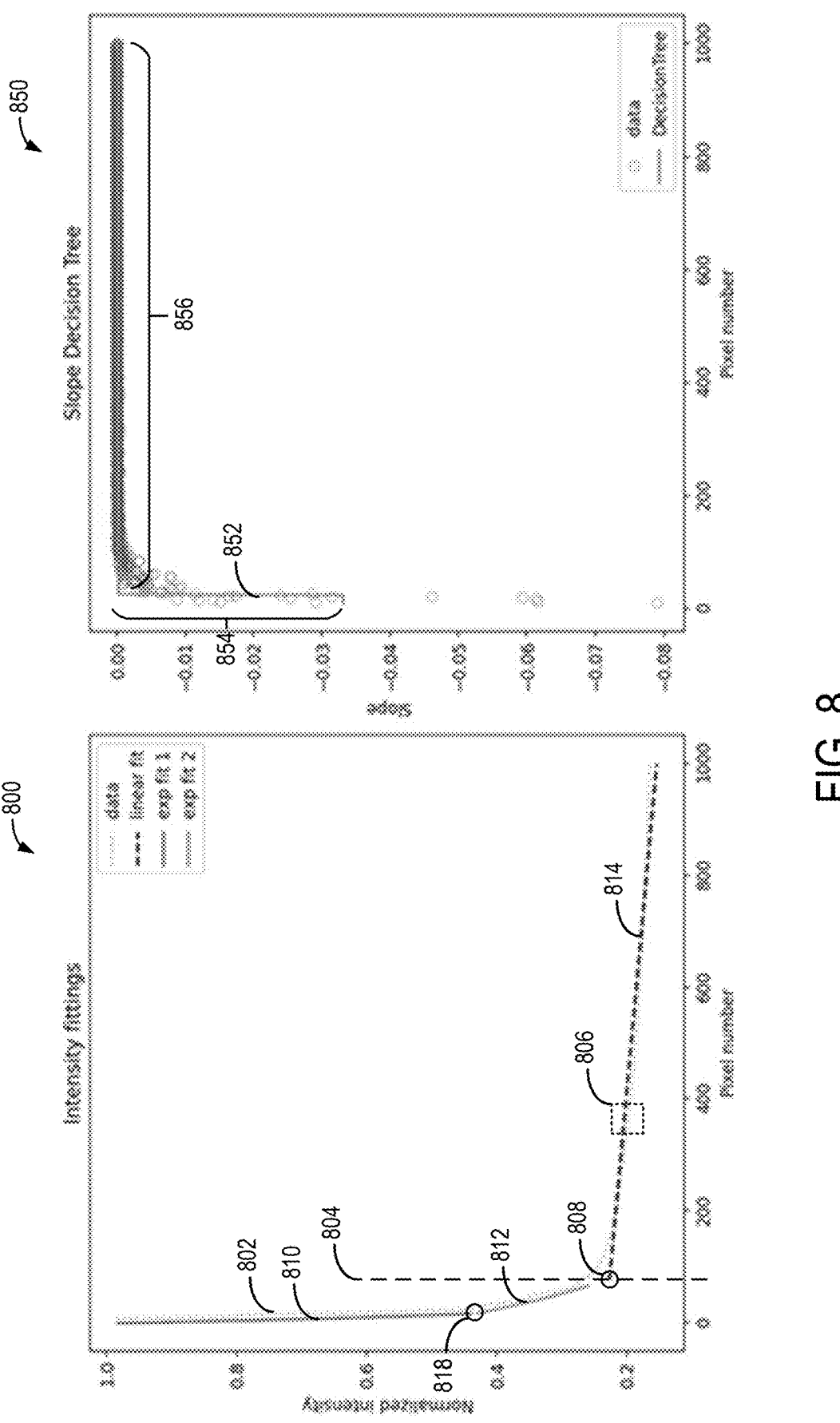
FIG. 8 shows plots illustrating a curve fitting process for a pixel intensity distribution.

Turning to FIG. 8, graphs are shown illustrating curve fitting that may be applied to intensity distribution curves, examples of which are shown in FIGS. 6 and 7. The graphs of FIG. 8 are representative examples of curve fitting applied to a single intensity distribution curve. It is to be understood that the curve fitting may be applied to each intensity distribution curve for each reference image to identify the plurality of parameters used in the method for adaptive pixel correction. A first graph 800 of FIG. 8 includes a first plot 802, which is an example intensity distribution curve. The first plot 802 may be the eighth plot 616 of the first graph 600 (64° C.), for illustrative purposes. An intersection of a vertical dashed line 804 and the first plot 802 illustrates a break-up point 808, where a slope of the first plot 802 transitions from a non-linear to a linear modeled slope. The break-up point 808 is less than the point at which a number of pixels of the first plot 802 has a normalized intensity of 0.2, as shown in the dashed line box 806 and described with respect to FIG. 6. For example, the break-up point 808 is at approximately 90 pixels, and the number of pixels that reaches 20% of full intensity is approximately 340 pixels, as indicated by a dashed line box 806 (e.g., the dashed line box 620 of FIG. 6). As further described herein, a break-up point may be identified that is less than (e.g., includes less pixels) an intensity threshold break-up to further specify pixel correction at different imaging conditions.

The break-up point 808 may be identified using a machine learning algorithm, such as a decision tree, as described with respect to the method 500. For example, the slope of the intensity distribution curve (e.g., the first plot 802) may be fed into a binary decision tree algorithm configured to identify sections of the curve having distinct slope distributions. The decision tree algorithm may identify a region comprising pixel numbers with intensities greater than those at the break-up point 808, and the region may be further divided and modeled using two exponential models. A first region 810 and a second region 812 before the break-up point 808 are each fit with an exponential decay model. Slopes of exponential decay models fit to the first region 810 and the second region 812 may be different from each other. For example, the first region 810 has a greater/faster decay rate than the second region 812. A third region after the break-up point 808 is fit with a linear decay model, and is referred to herein as a linear region 814. The linear region 814 comprises pixel numbers with intensities less than those at the break-up point 808, and may also undergo further division to generate sub regions and identify a true linear region. For example, criteria of quantifying a sub region as a true linear region may be based on statistics of the slope of the section, such as a maximum deviation or a standard deviation, and/or may be determined by a mean squared error of a linear model fit to the intensity curve. Identification of the "true" linear region, herein referred to as the linear region, linear modeling is applied thereto to find a slope and y-intercept of the model.

In the example of FIG. 8, the exponential model slopes on the left side of the break-up point 808 change rapidly, and the slope on the right side of the break-up point 808 is almost constant with a small magnitude at the level of $10^{-2}$. Therefore, for each additional pixel to the right of the break-up point 808 that is corrected, a maximum intensity of residual/uncorrected pixels reduces 0.01% of the full intensity range of the image. Therefore, it is desirable to select a cut-off pixel number for adaptive pixel correction that includes pixels prior to the break-up point 808 (e.g., to the left of and including the break-up point 808).

Slope values for each region are plotted in a second graph 850 of FIG. 8. A slope of the first region 810 is approximately −0.034. A slope of the linear region 814 is approximately −0.001. The second graph 850 shows a distribution of a local slope with respect to a pixel number. Each point is shown as an empty circle. Binary decisions from the decision tree algorithm are plotted as a solid line 852. Therefore, a vertical section 854 of the solid line 852 (e.g., of the binary decisions) shows the break-up point as determined by the decision tree. The cut-off point is further shifted to the right side of the break-up point (e.g., towards a linear region 856) by comparing moving-averaged slope data with the slope prediction of the linear model (e.g. the solid line 852). The shifted cut-off point has a smaller moving-averaged slope than the slope prediction provided by the linear model. This provides a conservatively-leaning break-up point that is shifted towards the linear region, such that residual uncorrected hot pixels (e.g., not identified by the methods described herein as a hot pixel to be corrected) that have an undesirably high intensity may not be included. A cut-off pixel number is selected to mark a largest pixel number of pixels to be corrected. Thus, a position of the cut-off pixel number is selected at least at the right of the break-up point 808. Additional pixels may be counted as hot pixels to be corrected by increasing the cut-off pixel number to be close to a beginning of the linear region.

In the example of FIG. 8, a first break-up point 818 between the first region 810 and the second region 812 has a pixel number value of 16. However, in order to avoid erroneously correcting "false" hot pixels (e.g., pixels having a true brightness intensity that is greater than the break-up point and not an artifact of the image sensor), the method for adaptive pixel correction may repeat a binary process at multiple points of the intensity distribution curve to identify the linear region. The decision tree algorithm may identify a second break-up point (e.g., the break-up point 808) that is greater than the first break-up point 818 to achieve a more conservative correction of hot pixels. The method for adaptive pixel correction identifies a cut-off pixel number using the break-up point 808 that is at a larger pixel number than the first break-up point 818 to identify the slope value identified as the transition between the linear slope and the non-linear slope by the decision tree algorithm as a true linear slope. The cut-off pixel number is identified at a point on the slope where a moving-averaged slope magnitude is smaller than the predicted slope value (e.g., the slope value predicted by a linear fit model). In the example of FIG. 8, the cut-off pixel number is identified at the pixel number 90. This method for identifying the cut-off pixel number using the break-up point provides more accurate linear fitting for the intensity curve in the linear region, compared to using the first break-up point 818 identified by the decision tree algorithm, and compared to methods that use a single threshold intensity value for identifying hot pixels at different imaging conditions.

Modeling the linear region of pixel intensity curves at different conditions (e.g., temperatures and exposure times) provides a model that enables quick computation of a cut-off point to be used in adaptive pixel correction. During setup of the imaging system (e.g., calibration of the imaging system, including identification of a maximum operating sensor temperature and a maximum exposure time), an extended hot pixel database is generated that contains coordinates of sorted hot pixels at the maximum sensor temperature with the longest specified exposure time. The extended hot pixel database may be stored in a memory of the computation device that controls the imaging system. For example, with respect to FIG. 1, the extended hot pixel database may be stored in the memory 114 of the imaging system 100. In the methods for adaptive pixel correction described with respect to FIGS. 3-5, the imaging conditions are identified and a cut-off point that corresponds with the imaging conditions is identified from the generated parameter model. The extended hot pixel database is referenced to identify coordinates of hot pixels with pixel numbers less than the cut-off point. The correction state includes removing pixel brightness data at the identified coordinates and replacing the pixel brightness data with a brightness that is a local statistic (mean or median) of surrounding pixel brightness (e.g., surrounding four pixels directly adjacent to the four sides of a pixel of interest, or nine pixels directly adjacent to the four sides of the pixel of interest and corners of the pixel of interest between the four pixels directly adjacent to the four sides of the pixel of interest). In this way, optimal and effective hot pixel mitigation is achieved by addressing the affected pixels.

Figure 9:
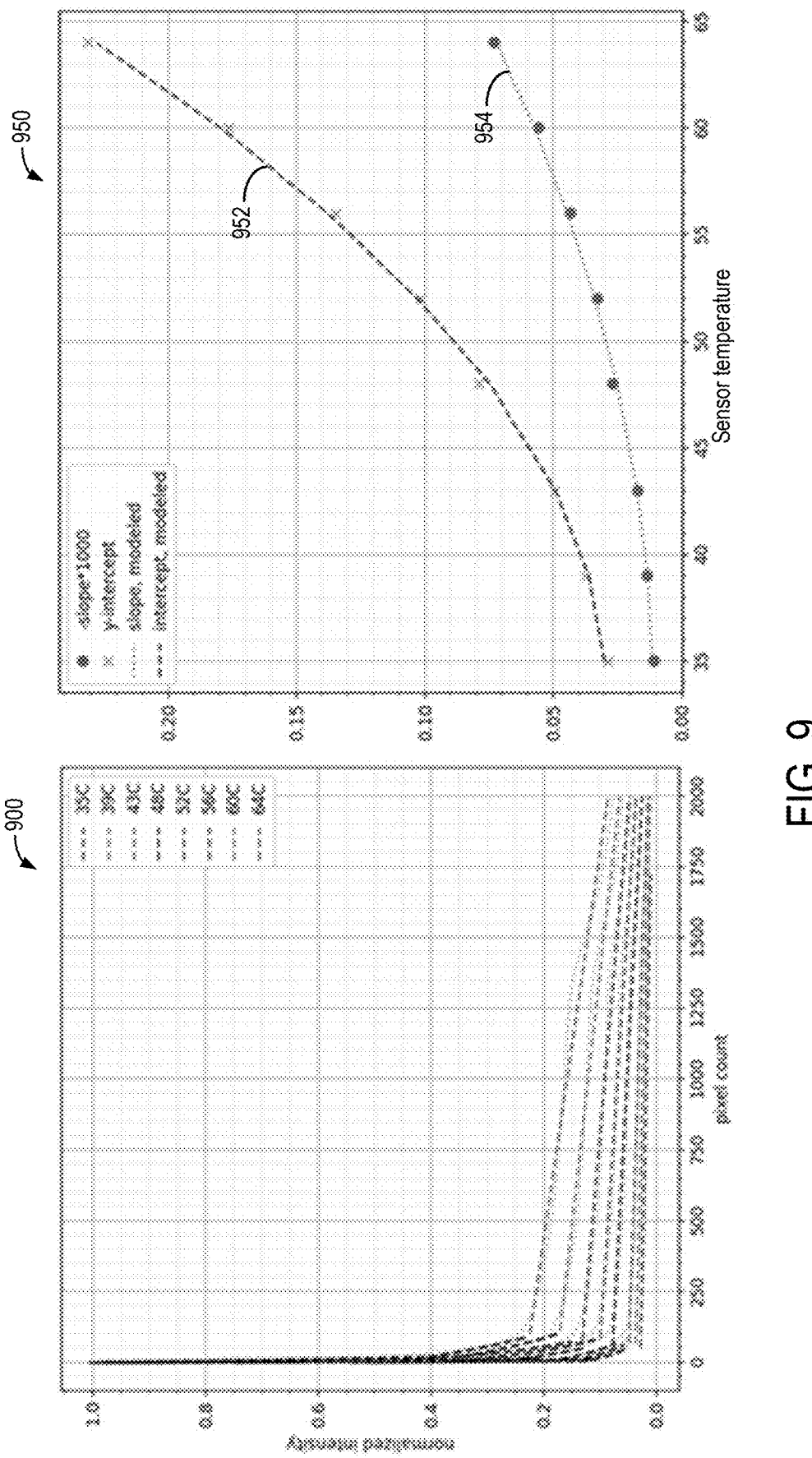
FIG. 9 shows plots illustrating models of sorted pixel intensity distribution and curve fitting at different sensor temperatures.

FIG. 9 shows a first graph 900 plotting fitted intensity distribution curves at various temperatures (e.g., 35-64°) and a second graph 950 plotting slopes (a first modeled plot 952) and y-intercepts (a second modeled plot 954) of the intensity curves of the first graph 900. The fitted intensity distribution curves shown in the first graph 900 are the intensity distribution curves shown in the first graph 600 of FIG. 6 and having curve modeling applied thereto as described with respect to FIGS. 3-8. As described with respect to the method 500 of FIG. 5, modeling intensity distribution curves as linear and non-linear regions, and plotting of the slopes and y-intercepts of the linear regions at different imaging conditions shows a dependency of the slope and y-intercept on sensor temperature. The second graph 950 shows a quadratic dependence: as sensor temperature increases, a slope of a linear region of the intensity curves at different sensor temperatures may be modeled as quadratically increasing. A y-intercept of the linear region of the intensity curves can also be modeled as quadratically increasing with increasing sensor temperature. With understanding of pixel intensity distribution on temperature dependency, pixel intensity distribution in the linear region may be easily computed with a given sensor temperature. The cut-off pixel number may be determined based on the location of the break-up point, as described with respect to FIGS. 3-8, and additional requirements of pixel intensity tolerance of the imaging session, provided the same exposure condition is used. For example, some application may be more sensitive to the isolated brighter pixels contributed by the uncorrected hot pixels. In these cases, the cut-off pixel number may be increased to ensure the maximum intensities of the uncorrected hot pixels is under such additional requirement.

Figure 10:
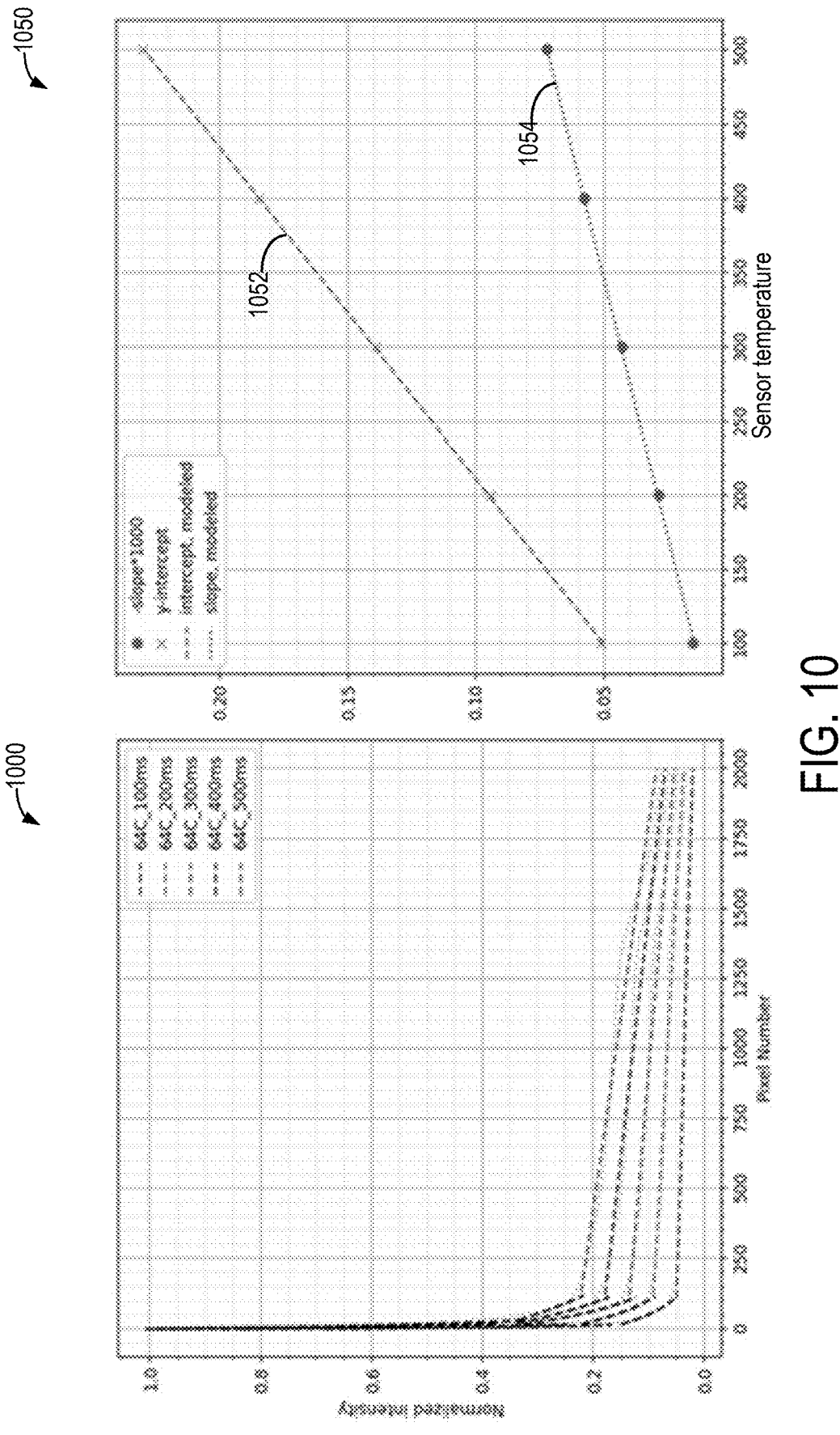
FIG. 10 shows plots illustrating models of sorted pixel intensity distribution and curve fitting at different exposure times.
Figure 11:
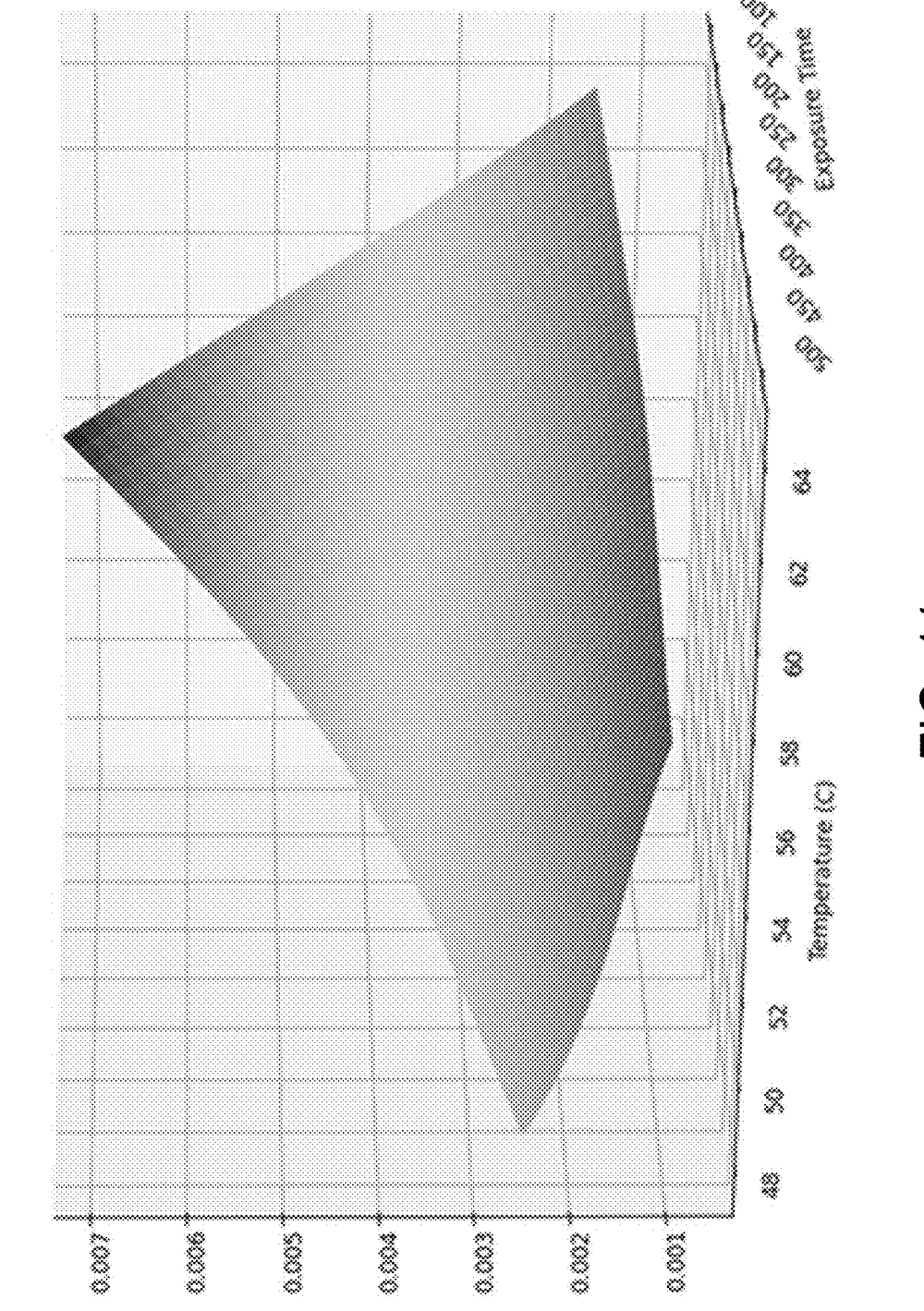
FIG. 11 shows a model of thermal and temporal dependency on pixel intensity distribution curves

FIG. 10 shows a first graph 1000 plotting fitted intensity curves at various exposure times (e.g., 100-500 ms at 64° C.), and a second graph 1050 plotting slopes (a first modeled plot 1052) and y-intercepts (a second modeled plot 1054) of the intensity curves of the first graph 1000. The fitted intensity distribution curves shown in the first graph 1000 are the intensity distribution curves shown in the second graph 700 of FIG. 7 and having curve modeling applied thereto as described with respect to FIGS. 3-8. Plotting the slopes and y-intercepts shows a linear dependency of the slope and y-intercept on exposure time at a fixed temperature. As exposure time increases, a slope of the linear region of the intensity curve is modeled as a linear increase. A y-intercept of the linear region of the intensity curves can also be modeled as linearly increasing with increasing exposure time. With this understanding of exposure time dependency of hot pixel intensity distribution, a pixel intensity distribution in a linear region may be easily computed with a given exposure time. However, as described herein, intensity distribution is not temperature invariant, and the temperature of the image sensor in the imaging study may differ from the sensor temperature used to model exposure time dependency. Therefore, linear modeling of exposure time dependency may be repeated at different sensor temperature settings across a temperature range of interest. For example, the temperature range of interest may be 35-64° C., and 100-500 ms exposure time at each temperature step.

FIG. 11 shows an example of a parameter model 1100 of linear region parameters, such as slope and y-intercept, of a pixel intensity curve dependence on sensor temperature and exposure time. The parameter model 1100 is demonstrated as a 3D surface with temperature ranging from 48° C. to 64° C., and a temporal exposure time ranging from 100 ms to 500 ms. Quadratic dependency on sensor temperature and linear dependency on exposure time are identifiable in the parameter model 1100. Qualities of fitting on both dependencies are high, therefore the 3D surface model may be represented by a relatively small number of parameters. In the example of FIG. 11, three parameters are used to represent each temperature model, and five temperature models are used. Two parameters are used for each exposure time model, and five exposure time models are used. Thus, the 3D parameter model 1100 may be constructed using 150 parameters (e.g., the product of parameters for each temperature model and each exposure time model). Bivariate spline interpolation may be used to find a predicted model for any temperature and exposure time settings. In other examples, thermal dependency may be modeled as a higher-order polynomial (e.g., greater than 2), and the temporal dependency may be modeled as a higher order than the linear relationship.

The parameter model 1100 may be used to automatically identify pixels to be corrected, and adapt corrections embedded in the image sensor of the imaging system based on imaging conditions to provide a configuration of the image sensor that enables capture of a pixel-corrected image for present imaging conditions. Using the model, a slope and a y-intercept of the linear region in the pixel intensity distribution may be found using simple interpolation for any given or detected sensor temperature and exposure conditions. The break-up point (e.g., near the beginning of the linear region) may be derived based on the hot pixel tolerance specification (e.g., number of hot pixels expected/predicted for the given temperature/exposure time). The cut-off pixel number may be selected based on the break-up point (e.g., equal to or greater than the break-up point). Pixels having a pixel numbers less than the cut-off pixel number are selected from the hot pixel database to be corrected. Coordinates of hot pixels are identified for sensor conditions (e.g., sensor temperature and exposure time) of an imaging scan by referencing the parameter model 1100. The coordinates are sent from the computing device to the imaging sensor. The imaging sensor receives the coordinates and performs calculations to replace the intensity of each identified pixel with a calculated average intensity, as described herein.

In this way, adaptive pixel correction may be performed automatically and conservatively in a way such that pixels to be corrected are identified prior to imaging, and corrected in the image sensor (e.g., camera) itself. As a result, multiple images may not be captured, and/or a captured image may not be corrected following capture. This may reduce processing cost and data storage demands, as well as reduce network traffic from sending data among multiple processing/storage devices. Further, the conservative nature of correction (e.g., setting the break-up point/cut-off pixel number at the transition between the linear and non-linear region) using the threshold intensity (e.g., 0.1% of maximum intensity) may direct correction of pixels to correction of at least a minimum amount of hot pixels and reduce excessive/over-correction of pixels having true greater intensity. As the parameter model is generated during imaging system setup/calibration and stored in the camera, the process for adaptive pixel correction may be automatic and fast, as it may be automatically implemented during each imaging session by referencing the parameter model stored in the computing device and not having to reprocess/identify temperature and exposure dependencies each time an imaging session is performed. Another advantage of adaptive pixel correction is that it may be performed without storing large quantities of data (e.g., large number of dark frames) in memory, and instead storing a parameter model that represents a broad range of sensor conditions. In some embodiments, the reduction of the data set may reduce the quantity of data processed or stored during the image acquisition process. In turn, this may increase the speed of the image acquisition process. This may further reduce the computational load and increase a computational efficiency of the adaptive pixel correction method.

The disclosure also provides support for a method for pixel correction of an image, comprising: acquiring reference images at different sensor temperatures and/or exposure times, generating a plurality of parameters via identifying a cut-off pixel number using a break-up point between a linear region and a non-linear region of an intensity curve for each reference image, sending coordinates of identified pixels to be corrected to an image sensor, capturing a pixel-corrected image via the image sensor by replacing a pixel intensity at coordinates of the identified pixels to be corrected with a local statistic intensity, and outputting the pixel-corrected image for display and/or storage. In a first example of the method, capturing the pixel-corrected image via the image sensor includes: receiving coordinates of pixels to be corrected, identifying coordinate locations of each pixel, calculating the local statistic intensity for each pixel to be corrected as a statistical average and/or a median value of intensities of surrounding pixels, and replacing an intensity value of each pixel with a respective local statistic intensity. In a second example of the method, optionally including the first example, acquiring reference images includes acquiring a plurality of reference images, where each reference image of the plurality of reference images is acquired at a different sensor temperature and a fixed exposure time, acquired at a fixed sensor temperature and a different exposure time, and/or acquired at a fixed sensor temperature and a fixed exposure time with both values randomly changed and distributed within the ranges of sensor temperature and exposure time of the imaging sensor. In a third example of the method, optionally including one or both of the first and second examples, the plurality of parameters provides a three dimensional (3D) model of thermal dependency and temporal dependency of a slope and a y-intercept of the linear region of pixel intensity distribution curves. In a fourth example of the method, optionally including one or more or each of the first through third examples, the 3D model is a parameter model generated using the plurality of parameters, such as the slope and the y-intercept of each of multiple hot pixel intensity linear regions acquired at various sensor conditions. In a fifth example of the method, optionally including one or more or each of the first through fourth examples, thermal dependency is a quadratic or a higher-order dependency, and wherein temporal dependency is a linear dependency. In a sixth example of the method, optionally including one or more or each of the first through fifth examples, identifying coordinates of pixels to be corrected via the image sensor, using the plurality of parameters includes: identifying image sensor operating conditions, and identifying coordinate locations of each pixel of a plurality of pixels identified as having intensity values below the cut-off pixel number for the image sensor operating conditions. In a seventh example of the method, optionally including one or more or each of the first through sixth examples, instructions for calculating the local statistic intensity for each pixel to be corrected are hard wired in circuitry of the image sensor.

The disclosure also provides support for a method for pixel correction of an imaging system, comprising: obtaining a reference image with the imaging system configured according to imaging conditions, removing pixels of the reference image having a brightness equal to a maximum intensity from a dataset of the reference image, plotting an intensity distribution curve of the dataset of the reference image, modeling the intensity distribution curve using a curve fitting algorithm, identifying a break-up point between a linear region and a non-linear region of the intensity distribution curve using a decision tree algorithm, obtaining a set of model parameters for the intensity distribution curve in the linear region based on results of the decision tree algorithm, generating a parameter model using the set of model parameters, and storing the parameter model in at least one memory of a computing device in the imaging system. In a first example of the method, the method further comprises: obtaining multiple reference images with the imaging system configured according to different imaging conditions. In a second example of the method, optionally including the first example, the different imaging conditions include different sensor temperature and fixed exposure time of the imaging system, fixed sensor temperature and different exposure time of the imaging system, and/or different sensor temperature and different exposure time of the imaging system. In a third example of the method, optionally including one or both of the first and second examples, plotting the intensity distribution curve comprises numbering each pixel, storing coordinates of a pixel with a corresponding pixel number, and sorting numbered pixels of the reference image by intensity. In a fourth example of the method, optionally including one or more or each of the first through third examples, modeling the intensity distribution curve using the curve fitting algorithm comprises identifying a transition between the linear region and the non-linear region of the intensity distribution curve using decision tree algorithm. In a fifth example of the method, optionally including one or more or each of the first through fourth examples, obtaining the set of model parameters comprises obtaining a slope and a y-intercept of the linear region. In a sixth example of the method, optionally including one or more or each of the first through fifth examples, generating the parameter model using the model parameters comprises modeling the slope and the y-intercept of linear regions of intensity curves captured for different imaging conditions derived by a single, three dimensional (3D) model. In a seventh example of the method, optionally including one or more or each of the first through sixth examples, the method further comprises: identifying sensor operating conditions of an image sensor of the imaging system, identifying coordinates of pixels to be corrected using the sensor operating conditions and the set of model parameters, and automatically correcting pixels captured in a raw image by the imaging system via the image sensor by replacing a pixel intensity at coordinates of the pixels to be corrected with a local statistic intensity. In an eighth example of the method, optionally including one or more or each of the first through seventh examples, the method further comprises: outputting a pixel-corrected image for display and/or storage.

The disclosure also provides support for an imaging system, comprising: an image sensor configured to capture an image, and a computing device wherein instructions configured, stored, and executed in a memory by processor of the computing device that when executed, cause the computing device to: acquire reference images and generate a plurality of parameters via identifying cut-off pixel numbers using break-up points of intensity distribution curves modeled at different sensor temperatures and/or exposure times, identify coordinates of pixels to be corrected via the image sensor, using the plurality of parameters, send coordinates to the image sensor, and capture a pixel-corrected image via the image sensor by replacing a pixel intensity at coordinates of the pixels to be corrected with a local statistic intensity. In a first example of the system, the instructions further cause the computing device to: obtain a reference image with the image sensor configured according to imaging conditions, remove pixels of the reference image having a brightness equal to a maximum intensity from a dataset of the reference image, plot an intensity distribution curve of the dataset of the reference image, model the intensity distribution curve using a curve fitting algorithm, identify a break-up point between a linear region and a non-linear region of an intensity curve using a decision tree algorithm, generate a set of parameters for the intensity distribution curve based on results of the decision tree algorithm, and store the set of parameters in at least one memory of the computing device. In a second example of the system, optionally including the first example, image sensor includes a correction module with computations that are hard wired in circuitry of the image sensor.

Note that the example control and estimation routines included herein can be used with various system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other microscope types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for pixel correction of an imaging system, comprising:

obtaining a reference image with the imaging system configured according to imaging conditions;

removing pixels of the reference image having a brightness equal to a maximum intensity from a dataset of the reference image;

plotting an intensity distribution curve of the dataset of the reference image;

modeling the intensity distribution curve using a curve fitting algorithm;

identifying a break-up point between a linear region and a non-linear region of the intensity distribution curve using a decision tree algorithm;

obtaining a set of model parameters for the intensity distribution curve in the linear region based on results of the decision tree algorithm;

generating a parameter model using the set of model parameters; and storing the parameter model in at least one memory of a computing device in the imaging system.

2. The method of claim 1, further comprising obtaining multiple reference images with the imaging system configured according to different imaging conditions.

3. The method of claim 2, wherein the different imaging conditions include different sensor temperature and fixed exposure time of the imaging system, fixed sensor temperature and different exposure time of the imaging system, and/or different sensor temperature and different exposure time of the imaging system.

4. The method of claim 1, wherein plotting the intensity distribution curve comprises numbering each pixel, storing coordinates of a pixel with a corresponding pixel number, and sorting numbered pixels of the reference image by intensity.

5. The method of claim 1, wherein modeling the intensity distribution curve using the curve fitting algorithm comprises identifying a transition between the linear region and the non-linear region of the intensity distribution curve using decision tree algorithm.

6. The method of claim 1, wherein obtaining the set of model parameters comprises obtaining a slope and a y-intercept of the linear region.

7. The method of claim 6, wherein generating the parameter model using the model parameters comprises modeling the slope and the y-intercept of linear regions of intensity curves captured for different imaging conditions derived by a single, three dimensional (3D) model.

8. The method of claim 6, further comprising:

identifying sensor operating conditions of an image sensor of the imaging system;

identifying coordinates of pixels to be corrected using the sensor operating conditions and the set of model parameters; and automatically correcting pixels captured in a raw image by the imaging system via the image sensor by replacing a pixel intensity at coordinates of the pixels to be corrected with a local statistic intensity.

9. The method of claim 8, further comprising outputting a pixel-corrected image for display and/or storage.

* * * * *